United States Patent
Ishiyama

(10) Patent No.: US 10,392,484 B2
(45) Date of Patent: Aug. 27, 2019

(54) CELLULOSE ACYLATE FILM, PRODUCTION METHOD OF CELLULOSE ACYLATE FILM, STACK, POLARIZING PLATE, AND LIQUID CRYSTAL DISPLAY DEVICE

(71) Applicant: FUJIFILM Corporation, Tokyo (JP)

(72) Inventor: Jun Ishiyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 280 days.

(21) Appl. No.: 15/280,020

(22) Filed: Sep. 29, 2016

(65) Prior Publication Data

US 2017/0088681 A1 Mar. 30, 2017

(30) Foreign Application Priority Data

Sep. 30, 2015 (JP) ................... 2015-195438

(51) Int. Cl.
| | | |
|---|---|---|
| *G02F 1/1335* | (2006.01) | |
| *C08J 5/18* | (2006.01) | |
| *G02B 1/14* | (2015.01) | |
| *C08K 5/205* | (2006.01) | |
| *G02B 5/30* | (2006.01) | |

(52) U.S. Cl.
CPC .............. *C08J 5/18* (2013.01); *C08K 5/205* (2013.01); *G02B 1/14* (2015.01); *G02B 5/3033* (2013.01); *C08J 2301/08* (2013.01); *C08J 2301/12* (2013.01); *G02F 1/133528* (2013.01); *G02F 2202/28* (2013.01); *Y10T 428/105* (2015.01)

(58) Field of Classification Search
CPC .......... G02F 1/133528; G02F 2202/28; C08K 5/205; C08J 5/18; C08J 2301/12; G02B 5/3033; Y10T 428/105; Y10T 428/1041; Y10T 428/1077

See application file for complete search history.

(56) References Cited

U.S. PATENT DOCUMENTS

| | | | |
|---|---|---|---|
| 2010/0055356 A1* | 3/2010 | Takeda | B32B 7/02 |
| | | | 428/1.31 |
| 2015/0219815 A1 | 8/2015 | Sato | |
| 2015/0361036 A1 | 12/2015 | Inada et al. | |

FOREIGN PATENT DOCUMENTS

| | | | |
|---|---|---|---|
| JP | 2005272566 A | * | 10/2005 |
| JP | 2011-116113 A | | 6/2011 |
| WO | 2014/057784 A1 | | 4/2014 |
| WO | 2014/133041 A1 | | 9/2014 |

\* cited by examiner

*Primary Examiner* — Sophie Hon
(74) *Attorney, Agent, or Firm* — Edward Neils, LLC; Jean C. Edwards, Esq.

(57) ABSTRACT

A cellulose acylate film includes cellulose acylate and a compound A which has a group represented by the formula (G) as defined herein and in which a value obtained by dividing a molecular weight of the compound by a number of the groups represented by formula (G) contained in the compound is 200 or less, and a content of the compound A is 15% by weight or more based on a content of the cellulose acylate, the iodine diffusion index X as defined herein is less than 0.005 and the iodine diffusion index Y as defined herein is 0.015 or more.

8 Claims, 2 Drawing Sheets

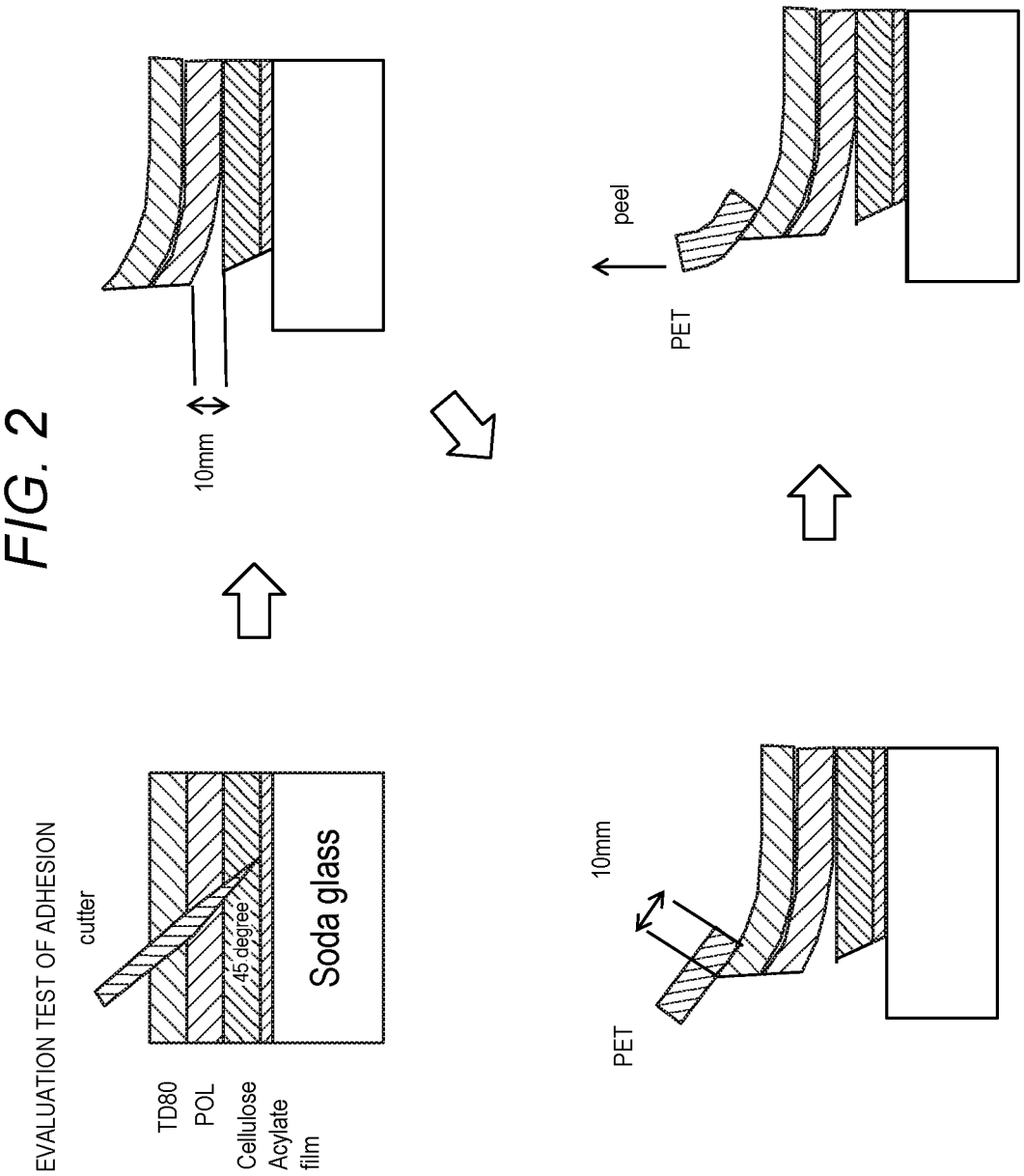

CELLULOSE ACYLATE FILM, PRODUCTION METHOD OF CELLULOSE ACYLATE FILM, STACK, POLARIZING PLATE, AND LIQUID CRYSTAL DISPLAY DEVICE

CROSS-REFERENCE TO RELATED APPLICATIONS

This application claims the benefit of Japanese Patent Application JP 2015-195438, filed Sep. 30, 2015, the entire content of which is hereby incorporated by reference, the same as if set forth at length.

FIELD OF THE INVENTION

The present invention relates to a cellulose acylate film, a production method of cellulose acylate film, a stack, a polarizing plate, and a liquid crystal display device.

BACKGROUND OF THE INVENTION

Cellulose acylate films are widely used as a polarizing plate protective film.

The polarizing plate includes a polarizer and a polarizing plate protective film, and a conventional polarizer is prepared by stretching a polyvinyl alcohol (PVA) film dyed with iodine.

In WO 2014/133041, there is described that surface hardness is increased by using a cellulose acylate film containing a specific compound having a urethane bond.

In WO 2014/057784, use of photocurable adhesive agent which is an adhesive agent not requiring an alkali saponification step is studied, and improvement in adhesiveness and suppression of deterioration of polarization degree of polarizing plate in the case where an optical compensation film containing cellulose acylate and an additive is stuck to a polarizer using a photocurable adhesive agent (actinic ray curable type adhesive agent) are described.

Further, in SP-A-2011-116113 (the term "JP-A" as used herein means an "unexamined published Japanese patent application"), a production method of cellulose acylate film having a base layer (core layer) and a surface layer (skin layer) which comprises a step of casting a solution containing cellulose acylate for forming the base layer and the surface layer and in which a ratio of a solvent acting as a good solvent for the cellulose acylate in the solution is defined in a specific range is described, and improvement in adhesion between the cellulose acylate film and a hardcoat layer is described.

SUMMARY OF THE INVENTION

It is known that the polarization degree of polarizing plate deteriorates due to color loss in high temperature and high humidity environment, and it is considered that the reason for this is that the iodine in the polarizer is diffused into the cellulose acylate film which is a polarizing plate protective film.

Therefore, it is considered that the deterioration of polarization degree can be suppressed by using a cellulose acylate film in which the iodine is hard to diffuse.

The inventor has estimated that the iodine is hard to diffuse in the cellulose acylate film of WO 2014/133041 because the specific compound having a urethane bond interacts with an ester bond or a hydroxy group of cellulose acylate to reduce free volume. Further, according to the experiments it has been confirmed that the deterioration of polarization degree can be surely suppressed. However, it has been found that in the case of using the actinic ray curable type adhesive agent, the adhesive agent is hard to permeate and there is room for improvement in the adhesion with a polarizer.

On the other hand, the deterioration of polarization degree due to the change of film orientation angle at the time of processing of a polarizing plate is referred to in WO 2014/057784, but the deterioration of polarization degree due to diffusion of iodine derived from the polarizer is not studied at all.

Moreover, in JP-A-2011-116113, a mechanism on the improvement in adhesion between the cellulose acylate film and the hardcoat layer is not described, and adhesion to a polarizer and suppression of deterioration of polarization degree in the case of using the actinic ray curable type adhesive agent are also not studied.

Therefore, an object of the invention is to provide a cellulose acylate film which can suppress the color loss of a polarizer in high temperature and high humidity environment and is excellent in adhesion to a polarizer in the case of sticking to the polarizer using an actinic ray curable type adhesive agent, a production method of the cellulose acylate film described above, a stack having the cellulose acylate film described above and an actinic ray curable type adhesive agent, a polarizing plate, and a liquid crystal display device.

As a result of intensive investigations, the inventor has found that the object described above can be achieved by the means described below.

[1]

A cellulose acylate film containing cellulose acylate and a compound A which has a group represented by formula (G) shown below and in which a value obtained, by dividing a molecular weight of the compound by a number of the groups represented by formula (G) is 200 or less, wherein a content of the compound A is 15% by weight or more with respect to the cellulose acylate, an iodine diffusion index X shown below is less than 0.005 and an iodine diffusion index Y shown below is 0.015 or more:

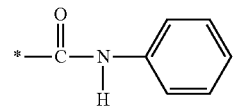

Formula (G)

in formula (G), *represents a connecting site;

The iodine diffusion index X is a value determined in the following manner:

The cellulose acylate film is immersed in an aqueous solution (a) containing 5.4 mg/L of potassium iodide and 0.36 mg/L of iodine at 60° C. for 30 minutes, absorbance $D_0$ of the cellulose acylate film at a wavelength of 360 nm before the immersion in the aqueous solution (a) and absorbance $D_X$ of the cellulose acylate film at a wavelength of 360 nm after the immersion in the aqueous solution (a) are measured, and from the absorbance $D_0$ and the absorbance $D_X$, the iodine diffusion index X is calculated according to formula (1) shown below:

Iodine diffusion index X=(absorbance $D_X$−absorbance $D_0$)/thickness (μm) of cellulose acylate film;    Formula (1)

The iodine diffusion index Y is a value determined in the following manner:

A sample in which an iodine blocking member is stacked on one side of the cellulose acylate film and a sample in which an iodine blocking member is stacked on the other side of the cellulose acylate film are prepared, each of the samples is immersed in the aqueous solution (a) at 60° C. for 1 minute, the iodine blocking member is peeled off from the cellulose acylate film, and absorbance of each of the cellulose acylate films at a wavelength of 360 nm is measured. Of the absorbances, the larger value is taken as absorbance $D_Y$ and the iodine diffusion index Y is calculated according to formula (2) shown below:

Iodine diffusion index $Y$=absorbance $D_Y$−absorbance $D_0$       Formula (2)

[2]

The cellulose acylate film as described in [1], wherein the cellulose acylate film has a skin layer and a core layer.

[3]

The cellulose acylate film as described in [2], wherein an average acyl substitution degree DS1 of cellulose acylate contained in the skin layer is from 2.1 to 2.8 and an average acyl substitution degree DS2 of the cellulose acylate contained in the core layer is from 2.4 to 2.95.

[4]

A production method of the cellulose acylate film as described in [2] or [3], wherein a dope for forming a skin layer containing from 90 to 98% by weight of a good solvent for the cellulose acylate with respect to the total solvent and a dope for forming a core layer are co-casted,

[5]

The production method of the cellulose acylate film as described in [4], wherein the dope for forming a core layer is a dope for forming a core layer containing from 70 to 87% by weight of a good solvent for the cellulose acylate with respect to the total solvent.

[6]

A stack having the cellulose acylate film as described in any one of [1] to [3] and an actinic ray curable type adhesive gent.

[7]

A polarizing plate wherein the cellulose acylate film as described in any one of [1] to [3] and a polarizer are stuck through an actinic ray curable type adhesive gent.

[8]

A liquid crystal display device having a liquid crystal cell and the polarizing plate as described in [7].

According to the invention, a cellulose acylate film which can suppress the color loss of a polarizer in high temperature and high humidity environment and is excellent in adhesion to a polarizer in the case of sticking to the polarizer using an actinic ray curable type adhesive agent, a production method of the cellulose acylate film described above, a stack having the cellulose acylate film described above and an actinic ray curable type adhesive agent, a polarizing plate, and a liquid crystal display device can be provided.

BRIEF DESCRIPTION OF THE DRAWINGS

FIG. 2 is a drawing illustrating the manner of the evaluation test of the adhesion.

DETAILED DESCRIPTION OF THE INVENTION

Figure 1:
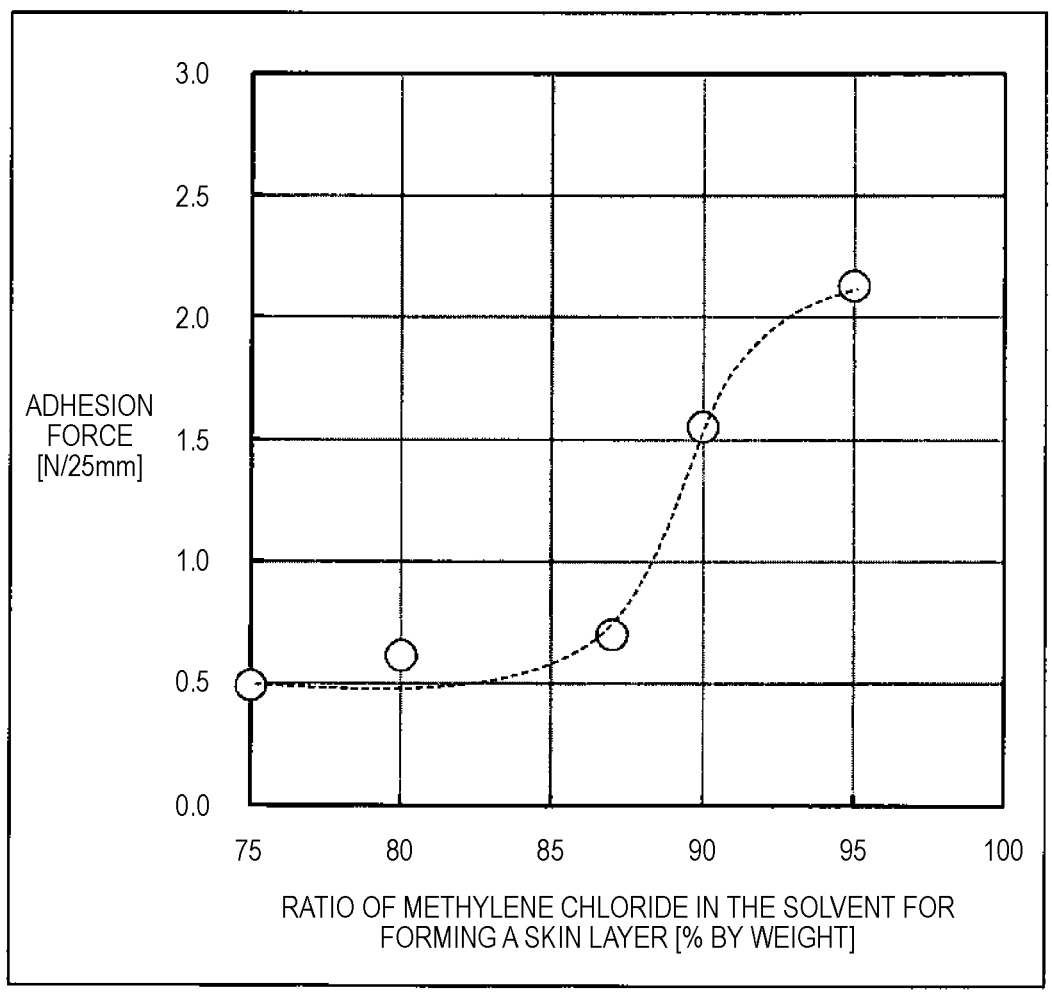
FIG. 1 is a drawing showing a relationship between a ratio of methylene chloride in a solvent of a dope for forming a skin layer and adhesion between a cellulose acylate film and a polarizer.

The invention will be described in detail below.

The description of the constituent element below is made based on the typical embodiment of the invention in some cases, but the invention should not be construed as being limited thereto. In the specification, a numerical value range represented by using the term "to" means a range which includes the numerical values described before and after the term "to" as a lower limit and an upper limit, respectively.

[Cellulose Acylate Film]

The cellulose acylate film (hereinafter, also referred to as a "film of the invention") according to the invention is a cellulose acylate film containing cellulose acylate and a compound A which has a group represented by formula (C) shown below and in which a value obtained by dividing a molecular weight of the compound by a number of the groups represented by formula (G) is 200 or less, wherein a content of the compound A is 15% by weight or more with respect to the cellulose acylate, an iodine diffusion index X shown below is less than 0.005 and an iodine diffusion index Y shown below is 0.015 or more.

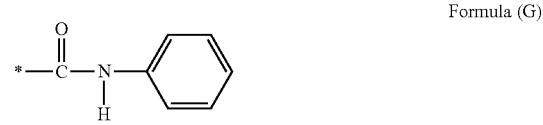 [SMILES: *C(=O)Nc1ccccc1]

Formula (G)

In formula (G), *represents a connecting site.

The iodine diffusion index X is a value determined in the following manner:

The cellulose acylate film is immersed in an aqueous solution (a) containing 5.4 mg/L of potassium iodide and 0.36 mg/L of iodine ($I_2$) at 60° C. for 30 minutes, absorbance $D_0$ of the cellulose acylate film at a wavelength of 360 nm before the immersion in the aqueous solution (a) and absorbance $D_X$ of the cellulose acylate film at a wavelength of 360 nm after the immersion in the aqueous solution (a) are measured, and from the absorbance $D_0$ and the absorbance $D_X$, the iodine diffusion index X is calculated according to formula (1) shown below:

Iodine diffusion index $X$=(absorbance $D_X$−absorbance $D_0$)/thickness (μm) of cellulose acylate film;       Formula (1)

The iodine diffusion index Y is a value determined in the following manner:

A sample in which an iodine blocking member is stacked on one side of the cellulose acylate film and a sample in which an iodine blocking member is stacked on the other side of the cellulose acylate film are prepared, each of the samples is immersed in the aqueous solution (a) at 60° C. for 1 minute, the iodine blocking member is peeled off from the cellulose acylate film, and absorbance of each of the cellulose acylate films at a wavelength of 360 nm is measured. Of the absorbances, the larger value is taken as absorbance $D_Y$ and the iodine diffusion index Y is calculated according to formula (2) shown below:

Iodine diffusion index $Y$=absorbance $D_Y$−absorbance $D_0$       Formula (2)

The iodine diffusion index X indicates a total diffusion amount of iodine in the thickness direction of the cellulose acylate film when the test of diffusing iodine is performed, and as the diffusion amount of iodine increases, the absorbance at a wavelength of 360 nm becomes larger so that as the iodine diffusion index X is smaller, the film has less iodine diffusion. The unit of the iodine diffusion index X is 1/μm.

The iodine diffusion index Y is determined by sublecting the film sample having an iodine blocking member stacked on one side thereof and the film sample having an iodine blocking member stacked on the other side thereof to the test of diffusing iodine, and calculated by using the absorbance $D_Y$ which corresponds to the larger diffusion amount of iodine. That is, the iodine diffusion index Y indicates the diffusion amount or iodine in the side in which iodine is apt to diffuse among the two side of cellulose acylate film. The unit of the iodine diffusion index Y is dimensionless.

The ultraviolet visible spectrophotometer is not particularly limited, and for example, UV-3150 produced by Shimadzu Corp. can be used.

The iodine blocking member is a member which is hard to penetrate iodine and specifically, it is a member in which a difference of the absorbances at a wavelength of 360 nm is 0.003 or less when the members are stuck on both side of a film of cellulose acetate alone and immersed in the aqueous solution (a), and the absorbance at a wavelength of 360 nm is measured before and after the immersion. The film of cellulose acetate alone is a film made only of cellulose acetate having a total acetyl substitution degree of 2.1 to 2.8. As the iodine blocking member, for example, an adhesive tape, for example, a heat resistance masking tape produced by 3M Co. can be used.

The film of the invention has the iodine diffusion index X of less than 0.005 and is a film which is hard to take in iodine (that is, iodine is hard to diffuse from the polarizer) as a whole. The film of the invention also has the iodine diffusion index Y of 0.015 or more and is a film having at least one side (a side different from the side on which the iodine blocking member has been stacked of the film on which the absorbance $D_Y$ has been measured) which is easy to take in iodine to some extent. Herein, to be easy to take in iodine indicates that the film, also easily takes in substances other than iodine so that when an actinic ray curable type adhesive agent is stacked on the side different from the side on which the iodine blocking member has been stacked of the film on which the absorbance $D_Y$ has been measured, the adhesive agent is easy to penetrate into the film. Therefore, it is believed that the cellulose acylate film of the invention can suppress the color loss of a polarizer in high temperature and high humidity environment and is excellent in the adhesion to a polarizer in the case of sticking to the polarizer using an actinic ray curable type adhesive agent.

The iodine diffusion index X is preferably less than 0.0045, and more preferably less than 0.0015. The iodine diffusion index Y is preferably 0.020 or more, and more preferably 0.025 or more.

[Compound A]

The compound A which is contained in the cellulose acylate film of the invention is described below.

The compound A indicates a compound which has a group represented by formula (G) shown below and in which a value (hereinafter, also referred to as U) obtained by dividing a molecular weight of the compound A by a number of the groups represented by formula (G) is 200 or less.

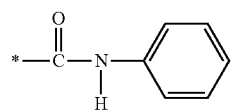

Formula (G)

In formula (G), *represents a connecting site.

It is believed that the urethane bond (—C(=O)—NH—) in the formula (G) reduces free volume in the film due to hydrogen bonding interaction with cellulose acylate to act so that the iodine is hard to diffuse in the film.

It is believed that the phenyl group in the formula (G) suppresses the movement of the cellulose acylate due to its rigid structure to act so that the iodine is hard to diffuse in the film. It is also believed that since the phenyl group does not have a substituent, distance between the group and the molecular chain of the cellulose acylate becomes sufficiently near. Moreover, it is believed that due to the connection of the urethane bond and the phenyl group the mobility of molecular chain of the cellulose acylate is suppressed to exert the effect of reducing the free volume.

The compound A is preferably a compound represented by formula. (J) shown below.

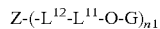　　　　Formula (J)

In formula (J), $L^{11}$ represents an alkylene group. The alkylene group may have a substituent. $L^{12}$ represents a single bond, any of —O—, —NR$^1$—, —S— and —C(=O)— or a group formed by a combination of these groups. R$^1$ represents a hydrogen atom or a substituent. Z represents an n1-valent group. n1 represents an integer of 1 to 6 and when plural $L^{11}$ and $L^{12}$ present, plural $L^{11}$ and $L^{12}$ may be the same or different from each other. G represents the group represented by formula (G) described above.

The alkylene group represented by $L^{11}$ may be any of straight-chain, branched and cyclic group, or may be an alkylene group in which at least one cyclic alkylene group (cycloalkylene group) is connected to at least one straight-chain or branched alkylene group. Specific examples of the straight-chain or branched alkylene group include a methylene group, an ethylene group, a propylene group, a butylene group, a pentylene group and a hexylene group. As the straight-chain or branched alkylene group, the alkylene group having from 1 to 20 carbon atoms is preferred, the alkylene group having from 1 to 12 carbon atoms is more preferred, the alkylene group having from 1 to 8 carbon atoms is still more preferred, the alkylene group having from 1 to 3 carbon atoms is particularly preferred, and a methylene group, an ethylene group or a propylene group is most preferred. As the cyclic alkylene group, a cyclohexylene group which may have a substituent is preferred. The alkylene group may have a substituent. Examples of the substituent which the alkylene group may have include Substituent group T described below. Among these substituents, as the substituent which the alkylene group may have, an alkyl group, an acyl group, an aryl group, an alkoxy group or a carbonyl group is preferred.

The straight-chain or branched alkylene group preferably has no substituent. The cyclic alkylene group preferably has a substituent.

$L^{12}$ represents a single bond, any of —O—, —NR$^1$, —S— and —C(=O)— or a group formed by combination of these groups and among them, a single bond, —O—, —NR$^1$— or —C(=O)— is preferred. R$^1$ represents a hydrogen atom or a substituent. The substituent includes an alkyl group, an alkenyl group, an aryl group and an acyl group. $R^1$ is preferably a hydrogen atom, an alkyl group having from 1 to 8 carbon atoms, an alkenyl group having from 2 to 8 carbon atoms, an alkynyl group having from 2 to 8 carbon atoms or an aryl group having from 6 to 18 carbon atoms (for example, a benzene ring group or a naphthalene ring group), and more preferably a hydrogen atom, or an alkyl group having from 1 to 4 carbon atoms.

$L^{12}$ is preferably a single bond, —O—*, —OC(=O)—*, —C(=O)O—*, —NR$^1$—* or —R$^1$N—* wherein * represents a connecting cite to Z or a cite connecting to an adjacent group on Z side, Substituent Group T:

An alkyl group (preferably having from 1 to 20 carbon atoms, more preferably having from 1 to 12 carbon atoms, particularly preferably having from 1 to 8 carbon atoms, and including, for example, a methyl group, an ethyl group, an isopropyl group, a tert-butyl group, an n-octyl group, an n-decyl group, an n-hexadecyl group, a cyclopropyl group, a cyclopentyl group or a cyclohexyl group), an alkenyl group (preferably having from 2 to 20 carbon atoms, more preferably having from 2 to 12 carbon atoms, particularly preferably having from 2 to 8 carbon atoms, and including, for example, a vinyl group, an allyl group, a 2-butenyl group or a 3-pentenyl group), an alkynyl group (preferably having from 2 to 20 carbon atoms, more preferably having from 2 to 12 carbon atoms, particularly preferably having from 2 to 8 carbon atoms, and including, for example, a propargyl group or a 3-pentynyl group), an aryl group (preferably having from 6 to 30 carbon atoms, more preferably having from 6 to 20 carbon atoms, particularly preferably having from 6 to 12 carbon atoms, and including, for example, a phenyl group, a biphenyl group or a naphthyl group), an amino group (preferably having from 0 to 20 carbon atoms, more preferably having from 0 to 10 carbon atoms, particularly preferably having from 0 to 6 carbon atoms, and including, for example, an amino group, a methylamino group, a dimethylamino group, a diethylamino group or a dibenzylamino group), an alkoxy group (preferably having from 1 to 20 carbon atoms, more preferably having from 1 to 12 carbon atoms, particularly preferably having from 1 to 8 carbon atoms, and including, for example, a methoxy group, an ethoxy group or a butoxy group), an aryloxy group (preferably having from 6 to 20 carbon atoms, more preferably having from 6 to 16 carbon atoms, particularly preferably having from 6 to 12 carbon atoms, and including, for example, a phenyl oxy group or a 2-naphthyl oxy group), an acyl group (preferably having from 1 to 20 carbon atoms, more preferably having from 1 to 16 carbon atoms, particularly preferably having from 1 to 12 carbon atoms, and including, for example, an acetyl group, a benzoyl group, a formyl group or a pivaloyl group), an alkoxycarbonyl group (preferably having from 2 to 20 carbon atoms, more preferably having from 2 to 16 carbon atoms, particularly preferably having from 2 to 12 carbon atoms, and including, for example, a methoxycarbonyl group or an ethoxycarbonyl group), an aryloxycarbonyl group (preferably having from 7 to 20 carbon atoms, more preferably having from 7 to 16 carbon atoms, particularly preferably having from 7 to 10 carbon atoms, and including, for example, a phenyloxycarbonyl group), an acyloxy group (preferably having from 2 to 20 carbon atoms, more preferably having from 2 to 16 carbon atoms, particularly preferably having from 2 to 10 carbon atoms, and including, for example, an acetoxy group or a benzoyloxy group), an acylamino group (preferably having from 2 to 20 carbon atoms, more preferably having from 2 to 16 carbon atoms, particularly preferably having from 2 to 10 carbon atoms, and including, for example, an acetylamino group or a benzoylamino group), an alkoxycarbonylamino group (preferably having from 2 to 20 carbon atoms, more preferably having from 2 to 16 carbon atoms, particularly preferably having from 2 to 12 carbon atoms, and including, for example, a methoxycarbonylamino group), aryloxycarbonylamino group (preferably having from 7 to 20 carbon atoms, more preferably group having from 7 to 16 carbon atoms, particularly preferably having from 7 to 12 carbon atoms, and including, for example, a phenyloxycarbonylamino group), a sulfonylamino group (preferably having from 1 to 20 carbon atoms, more preferably having from 1 to 16 carbon atoms, particularly preferably having from 1 to 12 carbon atoms, and including, for example, a methanesulfonylamino group or a benzenesulfonylamino group), a sulfamoyl group (preferably having from 0 to 20 carbon atoms, more preferably having from 0 to 16 carbon atoms, particularly preferably having from 0 to 12 carbon atoms, and including, for example, a sulfamoyl group, a methylsulfamoyl group, a dimethylsulfamoyl group or a phenylsulfamoyl group), a carbamoyl group (preferably having from 1 to 20 carbon atoms, more preferably having from 1 to 16 carbon atoms, particularly preferably having from 1 to 12 carbon atoms, and including, for example, a carbamoyl group, a methylcarbamoyl group, a diethylcarbamoyl group or a phenylcarbamoyl group), an alkylthio group (preferably having from 1 to 20 carbon atoms, more preferably having from 1 to 16 carbon atoms, particularly preferably having from 1 to 12 carbon atoms, and including, for example, a methylthio group or an ethylthio group), an arylthio group (preferably having from 6 to 20 carbon atoms, more preferably having from 6 to 16 carbon atoms, particularly preferably having from 6 to 12 carbon atoms, and including, for example, a phenylthio group), a sulfonyl group (preferably having from 1 to 20 carbon atoms, more preferably having from 1 to 16 carbon atoms, particularly preferably having from 1 to 12 carbon atoms, and including, for example, a mesyl group or a tosyl group), a sulfinyl group (preferably having from 1 to 20 carbon atoms, more preferably having from 1 to 16 carbon atoms, particularly preferably having from 1 to 12. carbon atoms, and including, for example, a methanesulfinyl group or a benzenesulfinyl group), a urethane group, a ureido group (preferably having from 1 to 20 carbon atoms, more preferably having from 1 to 16 carbon atoms, particularly preferably having from 1 to 12 carbon atoms, and including, for example, a ureido group, a methylureido group or a phenylureido group), a phosphoric amide group (preferably having from 1 to 20 carbon atoms, more preferably having from 1 to 16 carbon atoms, particularly preferably having from 1 to 12 carbon atoms, and including, for example, a diethyl phosphoric amide group or a phenyl phosphoric amide group), a hydroxyl group, a mercapto group, a halogen atom (for example, a fluorine atom, a chlorine atom, a bromine atom or an iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably having from 1 to 12 carbon atoms, in which examples of the hetero atom includes a nitrogen atom, an oxygen atom, and a sulfur atom, and specifically including, for example, an imidazolyl group, a pyridyl group, a guinolyl group, a furyl group, a piperidyl group, a morpholino group, a benzoxazolyl group, a benzimidazolyl group or a benzotniazolyl group), and a silyl group (preferably having from 3 to 40 carbon atoms, more preferably having from 3 to 30 carbon atoms, particularly preferably having from 3 to 24 carbon atoms, and including, for example, a trimethylsilyl group or a triphenylsilyl group).

The substituents may be further substituted. Moreover, when two or more substituents are present, the substituents may be the same or different from each other a In addition, when it is possible, the substituents may be connected to each other to form a ring.

Z represents an n1-valent connecting group, and is preferably a 2 to 6-valent connecting group, more preferably a 2 or 3-valent connecting group, and still more preferably a 2-valent connecting group.

Z may be only composed of at least one of a straight-chain, branched or cyclic aliphatic group and an aromatic group, and is preferably a combination of any one of these groups and an oxygen atom or a straight-chain or branched alkylene group. The aliphatic group contained in Z is preferably a saturated aliphatic group.

Since a rigid structure is formed by containing at least one of the branched or cyclic aliphatic group and the aromatic group, the surface hardness of the film tends to be further increased by incorporating the compound A number of carbon atoms constituting Z is preferably from 3 to 20, and more preferably from 4 to 15.

Z may have a substituent. Specific examples of the substituent include Substituent group T described above. Z preferably has no substituent.

Specifically, connecting groups shown below are preferred. *represents a cite connecting to $L^{12}$.

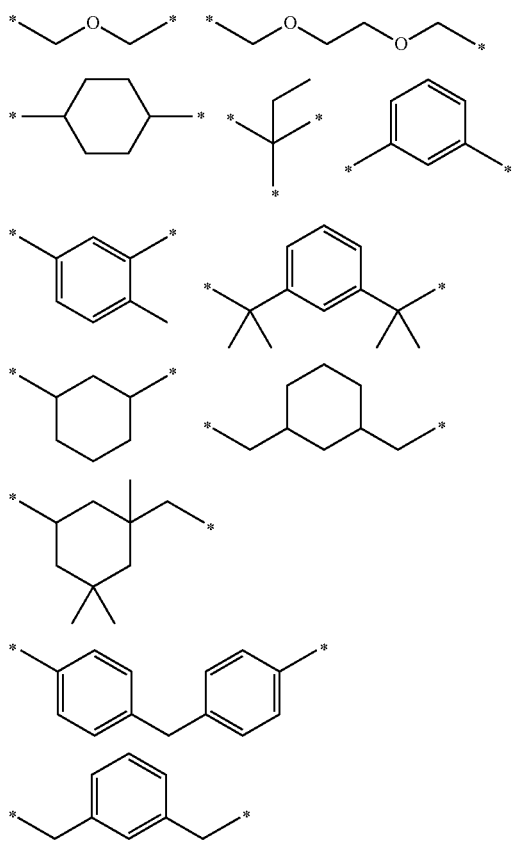

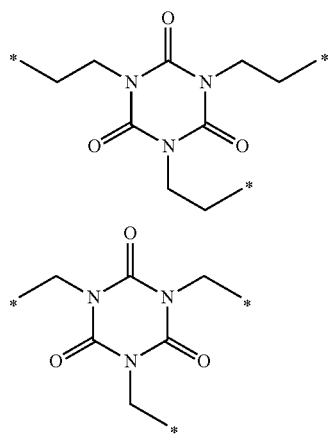

The compound represented by formula (J) contains at least one group represented by formula (G), and may contain two or more groups represented by formula (G). The number of the groups represented by formula (G) is preferably from 2 to 6, more preferably from 2 to 4, and still more preferably 2 or 3.

As to the compound A, the matters described in WO 2014/133041. can also be referred to the invention.

In the compound (A), the value U obtained as U=[(molecular weight of compound A)/(number of groups represented by formula (G) contained per molecule) ] is 200 or less.

The U denotes that as the value of U is smaller, the content of the groups represented by formula (G) contained per molecule increases. According to the compound A having the U of 200 or less, a cellulose acylate film which is hard to take in iodine can be obtained. The U is preferably 190 or less, more preferably 180 or less, and still more preferably 170 or less. As to the lower limit thereof, it is not particularly limited and is preferably 140 or more Examples of the compound A which can be preferably used in the invention are set forth below, but the invention should not be construed as being limited thereto.

Here, the "k" in (1-1-k) indicates the same number as k in the compound. For example, when k=2, the compound number is represented by (1-1-2) and the k in —$(CH_2)_k$— in the compound is 2. The same applies also to the compounds shown below.

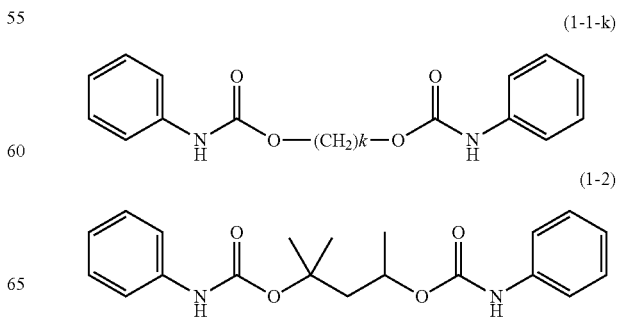

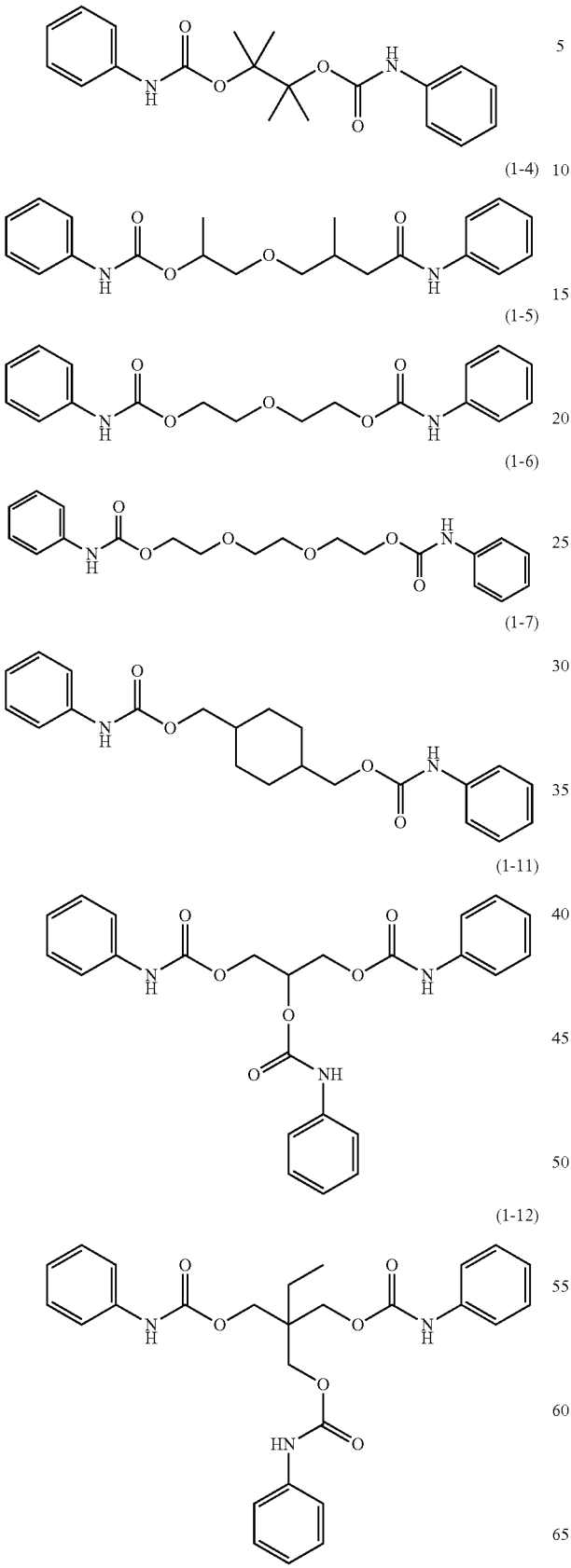
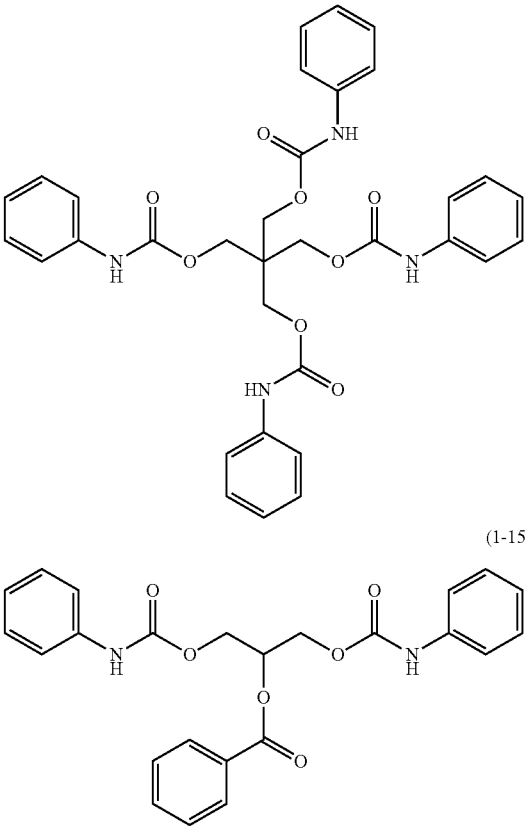

In the above, k is an integer of 2 to 8.

The content of the compound A contained in the cellulose acylate film is 15% by weight or more with respect to the total weight of the cellulose acylate. By setting the content of the compound A to 15% by weight or more with respect to the total weight of the cellulose acylate, the diffusion of iodine into the film can be suppressed.

The content of the compound A is preferably 18% by weight or more, more preferably 20% by weight or more, with respect to the total weight of the cellulose acylate. Also, the content of the compound A is preferably 40% by weight or less, more preferably 35% by weight or less, still more preferably 30% by weight or less, with respect to the total weight of the cellulose acylate.

[Cellulose Acylate]

Next, the cellulose acylate which is contained in the cellulose acylate film of the invention is described.

The cellulose acylate is an ester of cellulose and a carboxylic acid. The carboxylic acid is preferably a fatty acid having from 2 to 22 carbon atoms. A cellulose acylate composed of a lower fatty acid having from 2 to 4 carbon atoms is more preferred, and cellulose acetate having 2 carbon atoms is most preferred.

Examples of the cellulose which is a raw material of the cellulose acylate include cotton linter and wood pulp (broad-leaf tree pulp, coniferous tree pulp). Cellulose acylates obtained from any raw celluloses can be used, and the raw celluloses may be used as a mixture in some cases. These raw celluloses are described in detail, for example, in Plastic Zairyo Koza (17), Senni-kei Jushi (Plastic Material Lecture (17), Fiber-Based Resin), written by Marusawa and Uda, published by Nikkan Kogyo Shlnbun, Ltd-(1970) and Jill Journal. of Technical Disclosure, No. 2001-1745, pages 7 to 8, and the celluloses described therein can be used and are not particularly limited in the application thereof to the cellulose acylate film of the invention.

The cellulose acylate is a cellulose whose hydroxyl group is substituted with an acyl group, and a number of carbon atoms of the acyl group is preferably from 2 to 22. The acyl group having from 2 to 20 carbon atoms is not particularly limited and may be an aliphatic group or an aryl group or may be a single acyl group or a mixture of two or more acyl groups. Examples thereof include an alkylcarbonyl ester of cellulose, an alkenylcarbonyl ester of cellulose, an aromatic carbonyl ester of cellulose and an aromatic alkylcarbonyl ester of cellulose, and these esters may have a substituent. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecyl group, a hexadedanoyl group, an octadecanoyl group, an isobutanoyl group, a tert-butanoyl group, a cyclohexanecarbonyl group, an oleoyl group, a benzoyl group, a naphthylcarbonyl group and a cinnamoyl group. Of these groups, an acetyl group, a propionyl group, a butanoyl group, a dodecanoyl group, an octadecanoyl group, a tert-butanoyl group, an oleoyl group, a benzoyl group, a naphthylcarbonyl group, a cinnamoyl group and the like are preferred, an acetyl group, a propionyl group and a butanoyl group are more preferred, an acetyl group and a propionyl group are still more preferred, and an acetyl group is most preferred.

The polymerization degree of the cellulose acylate is preferably from 180 to 700 in terms of a viscosity average polymerization degree, and in the case of cellulose acetate, more preferably from 180 to 550, still more preferably from 180 to 400, and particularly preferably from 180 to 350. The viscosity average polymerization degree can be measured according to the intrinsic viscosity method by Uda, et al. (Kazuo Uda and Hideo Saito, Journal of the Society of Fiber Science and Technology, Japan, Vol. 18, No. 1, pages 105 to 120 (1962). This method is also described in detail in JP-A-9-95538.

The molecular weight distribution of the cellulose acylate is evaluated by gel permeation chromatography (GPC-8020 (trade name) produced by Tohso Corp.) using N-methylpyrrolidone as a solvent, and it is preferred that the polydispersity index Mw/Mn (Mw is a weight average molecular weight and Mn a number average molecular weight) small and the molecular weight distribution is narrow. Specifically, the Mw/Mn value Is preferably from 1.0 to 4.0, more preferably from 2.0 to 4.0, and most preferably from 2.3 to 3.4. (Acyl substitution degree of cellulose acylate)

The cellulose acylate which can be used in the invention is a cellulose whose hydroxyl group is acylated, and as to the measurement of the substitution degree of acyl group to the hydroxyl group of cellulose, the bonding degree of an acetic acid and/or a fatty acid having from 3 to 22 carbon atoms substituted on the hydroxyl group of cellulose is measured and the substitution degree can be obtained by calculation. As to the measuring method, the measurement can be performed in accordance with ASTM-D817-91.

The cellulose acylate film of the invention preferably has a layer and a core layer.

[Skin Layer]

The average acyl substitution degree DS1 of the cellulose acylate contained in the s layer is preferably from 2.1 to 2.8, more preferably from 2.3 to 2.7 and still more preferably from 2.5 to 2.6.

The content of the cellulose acylate in the s layer is preferably from 71 to 99% by weight, more preferably from 74 to 99% by weight, still more preferably from 77 to 99% by weight, with respect to the total weight of the skin layer.

The thickness of the skin layer is preferably from 0.3 to 5 μm, more preferably from 0.3 to 3 μm, and still more preferably from 0.3 to 2 μm.

The thickness of the skin layer is measured by using FE3000 (produced by Otsuka Electronics Co., Ltd.)

The skin layer may be present on one side of the core layer or may be present on both sides of the core layer.

[Core Layer]

The average acyl substitution degree DS2 of the cellulose acylate contained in the core layer is preferably from 2.4 to 2.95, more preferably from 2.5 to 2.8, and still more preferably from 2.6 to 2.7.

The content of the cellulose acylate in the core layer is preferably from 71 to 87% by weight, more preferably from 74 to 85% by weight, still more preferably from 77 to 83% by weight, with respect to the total weight of the core layer.

The thickness of the core layer preferably from 10 to 60 μm, more preferably from 15 to 55 μm, and still more preferably from 20 to 50 μm.

The thickness of the core layer is determined by measuring the thickness of the whole layers by a contact-type thickness meter and subtracting the thickness of the skin layer from the overall thickness.

[Other Additives]

According to the invention, as the additives of the cellulose acylate film, known additives can be used. Specific examples of the additive include an Rth controlling agent adjusting agent, a degradation preventing agent, an ultraviolet preventing agent, a release accelerating agent, a plasticizer, an infrared absorbing agent and a matting agent.

[Production Method of Cellulose Acylate Film]

The production method of a cellulose acylate film of the invention is described below.

The production method of a cellulose acylate film of the invention is a production method of a cellulose acylate film including co-casting of a dope for forming a skin layer which contains from 90 to 98% by weight of a good solvent for cellulose acylate with respect to the total solvent and a dope for forming a core layer which contains from 70 to 87% by weight of a good solvent for cellulose acylate with respect to the total solvent.

According to the production method of a cellulose acylate film described above, a ratio of the good solvent for cellulose acylate in the dope for forming a skin layer and the dope for forming a core layer is adjusted. In particular, by increasing the ratio of the good solvent for cellulose acylate in the dope for forming a skin layer, it is believed that the polymer chain of the cellulose acylate in the skin layer adequately spreads after drying so that an actinic ray curable type adhesive agent is easy to permeate into the film.

The good solvent is a solvent in which 10% by weight or more of cellulose acylate is dissolved at 20° C., and includes, for example, methylene chloride, chloroform, acetone and methyl acetate.

Moreover, a poor solvent is a solvent in which only less than 10% by weight of cellulose acylate is dissolved at 20° C., and includes, for example, methanol, ethanol and butanol.

(Preparation of Dope)

In the production method of a cellulose acylate film of the invention, it is preferred to produce by a solvent casting method. According to the solvent casting method, the film can be produced. by co-casting using the solutions (dope for forming a core layer and dope for forming a skin layer) prepared by dissolving a cellulose acylate and the Compound A in solvents in which the content of the good solvent is different from each other.

As the solvent, an organic solvent is preferred, and it is preferred to contain a solvent selected from an ether having from 3 to 12 carbon atoms, a ketone having from 3 to 12 carbon atoms, an ester having from 3 to 12 carbon atoms and a halogenated hydrocarbon having from 1 to 6 carbon atoms. The ether, ketone and ester may have a cyclic structure. A compound having any two or more functional groups of the ether, ketone and ester (that is, —O—, —CO— and —COO—) can also be used as the organic solvent. The organic solvent may have other functional group, for example, an alcoholic hydroxyl group.

Examples of the ether having from 3 to 12 carbon atoms include diisopropyl ether, dimethuxymethane, dimethoxyethane, 1,4-dioxane, 1,3-dioxolane, tetrahydrofuran, anisole and phenetole.

Examples of the ketone having from 3 to 12 carbon atoms include acetone, methyl ethyl ketone, diethyl ketone, diisobutyl ketone, cyclohexanone and methylcyclohexanone.

Examples of the ester having from 3 to 12 carbon atoms include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol.

The number of carbon atoms in the halogenated hydrocarbon is preferably 1 or 2, and most preferably 1. The halogen of the halogenated hydrocarbon is preferably chlorine. The ratio of a halogen substituting for hydrogen atom of the halogenated hydrocarbon is preferably from 25 to 75% by mole, more preferably from 30 to 70% by mole, still more preferably from 35 to 65% by mole, and most preferably from 40 to 60% by mole. Methylene chloride and chloroform are the representative halogenated hydrocarbons.

Of the organic solvents described above, the good solvent includes, for example, methylene chloride, chloroform, acetone and methyl acetate.

The content of the good solvent is more preferably from 92 to 97% by weight, still more preferably from 93 to 96% by weight, with respect to the total solvent in the dope for forming a skin layer.

Moreover, the content of the good solvent is more preferably from 75 to 85% by weight, still more preferably from 78 to 82% by weight, with respect to the total solvent in the dope for forming. a core layer.

The cellulose acylate, compound (A), other additives and the contents thereof in the dope for forming a skin layer and the dope for forming a core layer are same as those described with respect to the cellulose acylate film of the invention.

The solid content concentration of the dope for forming a skin layer is preferably from 10 to 24% by weight, more preferably from 12 to 22% by weight, and still more preferably from 15 to 20% by weight.

The solid content concentration of the dope for forming a core layer is preferably from 12 to 26% by weight, more preferably from 15 to 24% by weight, and still more preferably from 18 to 22% by weight .

The content of the cellulose acylate in the dope for forming a skin layer is preferably from 71 to 99% by weight, more preferably from 74 to 99% by weight, and still more preferably from 77 to 99% by weight, with respect to the total solid content.

The content of the cellulose acylate in the dope for forming a core layer is preferably from 71 to 87% by weight, more preferably from 74 to 85% by weight, and still more preferably from 77 to 83% by weight, with respect to the total solid content.

A dope (solution) can be prepared by stirring the cellulose acylate and the organic solvent at normal temperature (from 0 to 40° C.) The solution of high concentration may be stirred under pressurizing and heating conditions. Specifically, the cellulose acylate and the organic solvent are charged into a pressure vessel and hermetically sealed, and the mixture is stirred under pressure while heating at a temperature which is not lower than the boiling point of the solvent at normal pressure and does not cause boiling of the solvent. The heating temperature is ordinarily 40° C. or more, preferably from 60 to 200° C., and more preferably from 80 to 110° C.

The respective components may be coarsely mixed in advance and charged into the vessel or may be sequentially charged into the vessel. The vessel needs to be configured to allow for stirring. The vessel can be pressurized by injecting an inert gas, for example, nitrogen gas. Also, a rise in the vapor pressure of the solvent due to heating may be utilized. Alternatively, after hermetically closing the vessel, the respective components may be added under pressure.

In the case of heating, the mixture is preferably heated from the outside of the vessel. For example, a jacket-type heating apparatus can be used. It is also possible to heat the entire vessel by providing a plate heater on the outside of the vessel, piping and circulating liquid therein.

It is preferred that a stirring blade is provided in the inside of the vessel to perform the stirring by using it. A stirring blade having a length long enough to reach the vicinity of the vessel wall is preferred. At the end of the stirring blade, a scraping blade is preferably provided so as to renew the liquid film on the vessel wall.

The vessel may be provided with measuring instruments, for example, a pressure gauge and a thermometer. In the vessel, the respective components are dissolved in the solvent. The dope prepared is cooled and then taken out from the vessel or is taken out from the vessel and then cooled by using a heat exchanger or the like.

(Co-casting)

The co-casting method is a casting method in which the dopes for forming the respective layers (two layers or more layers) are simultaneously extruded through a casting Gieser to simultaneously cast all the layers on a drum or a band, and the coating is peeled off from the support at an appropriate time and dried to form a film. The concentration of each of the dope for forming a core layer and the dope for forming a skin layer before casting is preferably adjusted so as to be a solid content of 10 to 26% by weight. By adjusting the solid content of the dope to the range described above, the core layer and the skin layer are effectively mixed and a film in which the layer thicknesses and optical properties of the core layer and skin layer are uniform can be obtained.

The surface of the drum or band is preferably mirror-finished. The casting and drying methods in the solvent casing method are described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614, JP-A-60-176834, JP-A-60-203430 and JP-A-62-115035.

The dope is preferably cast on a drum or band having the surface temperature of −5 to 20° C. while dry air may be applied after the casting, the layer surface temperature is maintained preferably from −2 to 30° C., More preferably from 3 to 28° C., until drying reaches the state in which the residual solvent amount is 100% in view of forming a mixed layer of the skin layer and the core layer. From the stand point of reducing the time from the casting to the peeling off, it is preferred to dry with dry air at 60° C. or more in the state in which the residual solvent amount is 100% or less.

[Stack]

The stack of the invention is a stack having the cellulose acylate film of the invention and an actinic ray curable type adhesive agent, and the actinic ray curable type adhesive agent is preferably stacked on the side different from the side on which the iodine blocking member has been stacked of the film on which the absorbance $D_y$ has been measured.

[Actinic Ray Curable Type Adhesive Agent]

The actinic ray curable type adhesive agent is described below. The actinic ray curable type adhesive agent is an adhesive agent which causes a curing reaction upon actinic ray. Although the actinic ray curable type adhesive agent changes its structure between before and after the curing reaction, both of them are referred to as the actinic ray curable type adhesive agents.

The actinic ray curable type adhesive agent is preferably a photocurable adhesive agent composition containing three components (I), (II), and (III) shown below.

(I) Epoxy compound having at least two epoxy groups in a molecule
(II) Oxetane compound having at least one oxetanyl group in a molecule
(III) Cationic photopolymerization initiator Hereinafter, the epoxy compound of (I), the oxetane compound of (II) and the cationic photopolymerization initiator (III) described above are also simply referred to as an epoxy compound (I), an oxetane compound (II) and a cationic photopolymerization initiator (III), respectively.

The weight ratio of the epoxy compound of (I) to the oxetane compound of (IT) (epoxy compound of (I):oxetane compound of (II)) is preferably set to be approximately from 90:10 to 10:90. The cationic polymerization initiator (III) is preferably blended in the composition in a proportion of about 0.5 to 20% by weight.

The photocurable adhesive agent can arbitrarily contain an unsaturated compound having at least one ethylenically unsaturated bond in a molecule as a component (i). In the case where the photocurable adhesive agent contains the unsaturated compound (i), the photocurable adhesive agent preferably contains a photo-radical polymerization initiator as a component (ii). Moreover, the photocurable adhesive agent can also contain other component having no polymerizability as a component (iii).

The unsaturated compound of component (i), the photo-radical polymerization initiator of component (ii) and the other component having no polymerizability of component (iii) are also simply referred to as an unsaturated compound (i), a photo-radical polymerization initiator (ii) and other component having no polymerizability (iii), respectively.

(Epoxy Compound (I))

The epoxy compound (I) is not particularly limited as long as it has at least two epoxy groups in a molecule, and various conventionally known curable epoxy compounds can be used. Preferred examples of the epoxy compound (I) include a compound which has at least two epoxy groups and at least one aromatic ring in a molecule (hereinafter, referred to as an aromatic epoxy compound) and a compound which has at least two epoxy groups and in which at least one of the epoxy groups is formed on adjacent two carbon atoms constituting an alicyclic ring (hereinafter, referred to as an alicyclic epoxy compound)

The aromatic epoxy compound is not particularly limited as long as the effects of the invention are not impaired and examples thereof include a bisphenol type epoxy resin, for example, diglycidyl ether of bisphenol A, diglycidyl ether of bisphenol F or diglycidyl ether of brominated bisphenol A; a novolac type epoxy resin, for example, a phenol novolac epoxy resin or a cresol novolac epoxy resin; a biphenyl type epoxy resin, hydroquinone diglycidyl ether, resorcin diglycidyl ether, diglycidyl terephthalate, diglycidyl phthalate, an epoxy compound of styrene-butadiene copolymer, an epoxy compound of styrene-isoprene copolymer and an addition reaction product of terminal carboxylic acid polybutadiene with a bisphenol A type epoxy resin.

The epoxy resin denotes a compound or polymer which has two or more epoxy groups on average in a molecule and is cured by a reaction. By convention in the art, a compound having two or more curable epoxy groups in a molecule may be referred to as an epoxy resin, even if the compound is a monomer.

The alicyclic epoxy compound is not particularly limited as long as the effects of the invention are not impaired and examples thereof include compound having at least one epoxidized cyclohexyl group, for example, dicyclopentadiene dioxide, limonene dioxide, 4-vinylcyclohexene dioxide, 3,4-epoxycyclohexylmethyl-3,4-epoxycyclohexane carboxylate and bis(3,4-epoxycyclonexylmethyl) adipate.

In addition to the above, an aliphatic epoxy compound, for example, 1,6-hexanediol diglycidyl ether, trimethylolpropane diglycidyl ether, pentaerythritol tetraglycidyl ether or polytetramethylene glycol diglycidyl ether; an epoxy compound in which an aromatic ring is hydrogenated, for example, diglycidyl ether of hydrogenated bisphenol A; a polymertype epoxy compound, for example, a compound in which both hydroxyl terminals of polybutadiene are glycidyl-etherified, a compound in which double bonds of styrene-butadiene copolymer are partially epoxidized (for example, Epofriend, produced by Daicel Corp.) or a block copolymer of ethylene-butylene copolymer and polyIsoprene in which the isoprene units are partially epoxidized (for example, L-207, produced by Kraton Inc.) are also used as the epoxy compound (I).

Of the epoxy compounds (I) the aromatic epoxy compound is preferred because it is excellent in durability or the like when used in a polarizing plate and, in particular, it is excellent in adhesiveness to a polarizer and the cellulose ac ate film. Moreover, preferred examples of the aromatic epoxy compound include a glycidyl ether of aromatic compound and a glycidyl ester of aromatic compound. Specific preferred examples of the glycidyl ether of aromatic compound include a bisphenol type epoxy resin, for example, diglycidyl ether of bisphenol A, diglycidyl ether of bisphenol F or diglycidyl ether of borominated bisphenol A; a novolac type epoxy resin, for example, a phenol novolac epoxy resin or a cresol novolac epoxy resin; a biphenyl type epoxy resin; hydroquinone diglycidyl ether; and resorcin diglycidyl ether. Specific preferred examples of the glycidyl ester of aromatic compound include diglycidyl terephthalate and diglycidyl phthalate.

Among them, the glycidyl ether of aromatic compound is particularly preferred because it is more excellent in the adhesion between a polarizer and the cellulose acylate film and the durability when used in a polarizing plate. Of the glycidyl ethers of aromatic compound, diglycidyl ether of bisphenol A, diglycidyl ether of bisphenol F and a phenol novolac epoxy resin are particularly preferred.

The epoxy compound (I) may be used one kind alone or may be used two or more kinds in combination. For example, two or more kinds of the aromatic epoxy compounds are mixed to use, or the alicyclic epoxy compound is mixed as the main component, with the aromatic epoxy compound to use.

(Oxetane Compound (II))

The oxetane compound (II) is not particularly limited as long as it has at least one oxetanyl group in a molecule, and various compounds having an oxetanyl group can be used. Preferred examples of the oxetane compound (II) include a compound having one oxetanyl group in a molecule (hereinafter, referred to as a monofunctional oxetane) and a compound having two or more oxetanyl groups in a molecule (hereinafter, referred to as a polyfunctional oxetane).

Preferred examples of the monofunctional oxetane include an alkoxyalkyl group-containing monofunctional oxetane, for example, 3-ethyl-3-(2-ethylhexyloxymethyl) oxetane, an aromatic group-containing monofunctional oxetane, for example, 3-ethyl-3-phenoxymethyloxetane, and a hydroxyl group-containing monofunctional oxetane, for example, 3-ethyl-3-hydroxymethyloxetane.

Examples of the polyfunctional oxetane include 3-ethyl-3-[(3-ethyloxetan-3-yl)methoxymethyl]oxetane, 1,4-bis[(3-ethyloxetan-3-yl)methoxymethyl]benzene, 1,4-bis[(3-ethyl-oxetan-3-yl)methoxy]benzene, 1,3-bis[(3-ethyloxetane-3-yl)methoxy]benzene, 1,2-bis[(3-ethyloxetan-3-yl)methoxy] benzene, 4,4'-bis[(3-ethyloxetan-3-yl)methoxy]biphenyl, 2,2'-bis[(3-ethyloxetan-3-yl)methoxy]biphenyl, 3,3',5,5'-tetramethyl-4,4'-bis[(3-ethyloxetan-3-yl)methoxy]biphe nyl, 2,7-bis[(3-ethyloxetan-3-yl)methoxy]naphthalene, bis[4-{(3-ethyloxetan-3-yl)methoxy}phenyl]methane, bis[2-{(3-ethyloxetan-3-yl)methoxy}phenyl]methane, 2,2-bis[4-{(3-ethyloxetan-3-yl)methoxy}phenyl]propane, an etherified modified product of novolac-type phenol-formaldehyde resin with 3-chloromethyl-3-ethyloxetane, 3(4),8(9)-bis[(3-ethyloxetan-3-yl)methoxymethyl]tricyclo[5.2.1.0 2,6]decane,2,3-bis[(3-ethyloxetan-3-yl)methoxymethyl]norbornane, 1,1,1-tris[(3-ethyloxetan-3-1)methoxymethyl] propane, 1-butoxy-2,2-bis[(3-ethyloxetan-3-yl) methoxymethyl]butane, 1,2-bis[{2-(3-ethyloxetan-3-yl) methoxy}ethylthio]ethane, bis[{4-(3-ethyloxetan-3-yl) methylthio}phenyl]sulfide, 1,6-bis[(3-ethyloxetan-3-yl) methoxy]-2,2,3,3,4,4,5,5-octafluoroh exane, a hydrolysis condensate of 3-[(3-ethyloxetan-3-yl)methoxy]propyltriethoxysilane and a condensate of tetrakis[(3-ethyloxetan-3-yl)methyl]silicate.

The oxetane compound (II) is preferably liquid at room temperature and having a molecular weight of 500 or less from the standpoint of the coating properties of the adhesive agent and the adhesion to the cellulose acylate film when used in a polarizing plate Moreover, a monofunctional oxetane having an aromatic ring in a molecule or a polyfunctional oxetane is more preferred in view of the excellent durability of a polarizing plate. Preferred examples of the oxetane compound include 3-ethyl-3-phenoxymethyloxetane, 3-ethyl-3-[(3-ethyloxetan-3yl)methoxymethyl]oxetane and 1,4-bis [(3-ethyloxetan-3-yl)methoxymethyl]benzene.

The oxetane compound (II) can be used one kind alone or can be used two or more kinds in combination.

A weight ratio of the epoxy compound (I) to the oxetane compound (II) (epoxy compound (I):oxetane compound (II)) is set to be 90: 10 to 10:90. When the weight ratio is outside of the range, the effect of curing in a short time which is one of the important characteristics of the photocurable adhesive agent composition which can be used in the invention cannot be sufficiently attained. The weight ratio is preferably approximately from 70:30 to 20:80, more preferably approximately from about. 60:40 to 25:75, because the adhesive agent has low viscosity and is excellent the coating properties before curing and can exerts the sufficient adhesion and flexibility after curing.

(Cationic Photopolymerization Initiator (III))

The photocurable adhesive agent composition which can be used in the invention contains the epoxy compound (I) and the oxetane compound (II) described above as the curable components. Since both of these compounds are curable by cation polymerization, in order to initiate the cation polymerization, it is preferred to blend a cationic photopolymerization initiator (III). The cationic photopolymerization initiator (III) generates a cationic species or a Lewis acid by irradiation of active energy ray, for example, visible light, ultraviolet ray, X-ray or electron beam, to initiate the polymerization reaction of the epoxy group or the oxetanyl group.

By blending the cationic photopolymerization initiator (III), the curing at room temperature becomes possible so that the cellulose acylate film can be well adhered with small need to considering the heat resistance of the polarizer or distortion of the polarizer due to thermal expansion or shrinkage. Moreover, since the cationic photopolymerization initiator (III) catalytically acts by the irradiation of active energy ray, it is excellent in preservation stability and workability even when it is mixed with the epoxy compound (I) and the oxetane compound (II).

Examples of the cationic photopoerization initiator (III) which generates a cationic species or a Lewis acid by irradiation of active energy ray include an onium salt, for example, an aromatic diazonium salt, an aromatic iodonium salt or an aromatic sulfonium salt, and an iron-allene complex.

Examples of the aromatic diazonium salt include benzenediazonium hexafluoroantimonate, benzenediazonium hexafluorophosphate and benzenediazonium hexafluoroborate.

Examples of the aromatic iodonium salt include diphenyliodonium tetrakis (pentafluorophenyl) borate, diphenyliodonium hexafluorophosphate, diphenyliodonium hexafluoroantimonate and di (4-nonylphenyl) iodonium hexafluorophosphate.

Examples of the aromatic sulfonium salt include triphenylsulfonium hexafluorophosphate, triphenylsulfonium hexafluoroantimonate, triphenylsulfonium tetrakis (pentafluorophenyl) borate, diphenyl [4 -(phenylthio) phenyl]sulfonium hexafluorophosphate, diphenyl [4-(phenylthio) phenyl]sulfonium hexafluoroantimonate, 4, 4'-bis (diphenylsulfonio) diphenylsulfide bishexafluorophosphate, 4'-bis [di(β-hydroxyethoxy) phenylsulfonio]diphenylsulfide bishexafluoroantimonate, 4,4'-bis[di(β-hydroxyethoxy)phenylsulfonio]diphenylsulfide bishexafluorophosphate, 7-[di (p-tolyl)sulfonio]-2-isopropylthioxanthone hexafluoroantimonate, 7-[di(p-tolyl)sulfonio]-2-isopropylthioxanthone tetrakis(pentafluorophenyl)borate, 4-phenylcarbonyl-4'-diphenylsulfonio-diphenylsulfide hexafluorophosphate, 4-(p-tert-butylphenylcarbonyl)-4'-diphenylsulfonio-diphenylsulfi de hexafluoroantimonate and 4-(p-tert-butylphenylcarbonyl)-4'-di(p-tolyl)sulfonio-diphenylsu lfide tetrakis(pentafluorophenyl)borate.

Examples of the iron-allene complex include xylene-cyclopentadienyl iron (II) hexafluoroantimonate, cumene-cyclopentadienyl iron (II) hexafluorophosphate and xylene-cyclopentadienyl iron (II) tris(trifluoromethylsulfonyl) methanide.

The cationic photopolymerization initiator (III) may be used one kind alone or may be used two or more kinds in combination. Of the compounds, the aromatic sulfonium salt is particularly preferably used because it has ultraviolet ray absorbing properties even in the wavelength region of 300 nm or more to be excellent in the curing property, and can provide a cured product having good mechanical strength and good adhesive strength.

As to the cationic photopolymerization initiator (III), commercial products are easily available. Examples of the commercial product include, as trade names, Kayarad PCI-220 and Kayarad PCI-620 (produced by Nippon Kayaku Co., Ltd.), UVI-6992 (produced by Dow Chemical Co.), Adeka Optomer SP-150 and Adeka Optomer SP-170 (produced. by Adeka Corp.), CI-5102, CIT-1370, CIT-1682, CIP-1866S, CIP-2048S and CIP-2064S (produced by Nippon Soda Co. , Ltd.), DPI-101, DPI-102, DPI-103, DPI-105, MPI-103, MPI-105, BBI-101, BBI-102, BBI-103, BBI-105, TPS-101, TPS-102, TPS-103, TPS-105, MDS-103, MDS-105, DTS-102 and DTS-103 (produced by Midori Kagaku Co., Ltd.), PI-2074 (produced by Rhodia S.A.), Irgacure 250, Irgacure PAG103, Irgacure PAD-108, Irgacure PAG121 and Irgacure PAG203 (produced by BASF Japan Ltd.), and CPI-100P, CPI-101A, CPI-200K and CPI-210S (produced by San-Apro Ltd.). Among them, UVI-6992, CPI-100P, CPI-101A, CPI-200K and CPI-210S, which contain diphenyl [4-(phenylthio)phenyl]sulfonium as a cationic component, are preferred.

A blending ratio of the cationic photopolymerization initiator (III) is preferably in a range from 0.5 to 20% by weight based on the total photocurable adhesive agent.

The actinic ray curable type adhesive agent also preferably includes a photocurable adhesive agent composition containing component (i) and component (ii) shown below.
(i) Unsaturated compound having at least one ethylenically unsaturated bond in a molecule
(ii) Photo-radical polymerization initiator
(Unsaturated Compound (i))

The photocurable adhesive agent preferably contains an unsaturated compound having at least one ethylenically unrated bond in a molecule (i), if desired.

Typical examples of the unsaturated compound (i) include a (meth)acrylic compound having at least one (meth)acryloyl group in a molecule.

The (meth)acrylic compound is not particularly limited and includes, for example, a (meth)acrylate, a (meth)acrylamide, (meth)acrylic acid, (meth)acryloylmorpholine and (meth)acrylic aldehyde.

The (meth)acrylate having one (meth)acryloyl group in a molecule (hereinafter, referred to as a monofunctional (meth)acrylate) is not particularly limited and includes, for example, an alkyl (meth)acrylate, for example, methyl (meth)acrylate, ethyl (meth)acrylate, propyl (meth)acrylate, isopropyl (meth)acrylate, butyl (meth)acrylate, isobutyl (meth)acrylate, 2-ethylhexyl (meth)acrylate, octyl (meth) acrylate, isooctyl (meth)acrylate, lauryl (meth)acrylate, or stearyl (meth)acrylate; a hydroxyalkyl (meth)acrylate, for example, 2-hydroxyethyl (meth)acrylate, 2-hydroxypropyl (meth)acrylate or 4-hydroxybutyl (meth)acrylate; an alicyclic monofunctional (meth)acrylate, for example, cyclohexyl (meth)acrylate, isobornyl (meth)acrylate, 1,4-cyclohexanedimethylol mono (math)acrylate, dicyclopentanyl (meth)acrylate, dicyclopentenyl (meth)acrylate or dicyclopentenyloxyethyl (meth)acrylate; a monofunctional (meth) acrylate having an aromatic ring, for example, benzyl (meth) acrylate, (meth)acrylate of p-cumylphenol alkylene oxide adduct, (meth)acrylate of o-phenylphenol alkylene oxide adduct, (meth)acrylate of phenol alkylene oxide adduct or (meth)acrylate of nonylphenol alkylene oxide adduct (wherein examples of the alkylene oxide include ethylene oxide and propylene oxide); an alkoxyalkyl (meth)acrylate, for example, 2-methoxyethyl (meth)acrylate, ethoxymethyl (meth)acrylate or (meth)acrylate of alkylene oxide adduct of 2-ethylhexyl alcohol; a mono(meth)acrylate of dihydric alcohol, for example, ethylene glycol mono(meth)acrylate, propylene glycol mono(meth)acrylate, per mono(meth)acrylate or hexanediol mono(meth)acrylate; a mono(meth)acrylate of polyalkylene glycol, for example, mono (moth) acrylate of diethylene glycol, mono(meth)acrylate of tri ethylene glycol, mono(meth)acrylate of tetreethylene glycol, mono(meth)acrylate of polyethylene glycol, mono(meth) acrylate of dipropylene glycol, mono(meth)acrylate of tripropylene glycol or mono(meth)acrylate of polypropylene glycol; glycidyl (meth)acrylate; tetrahydrofurfuryl (meth) acrylate, for example, tetrahydrofurfuryl (meth)acrylate or caprolactone-modified tetrahydrofurfuryl (meth)acrylate; 3,4-epoxycyclohexylmethyl (meth)acrylate; N,N-dimethylaminoethyl (meth)acrylate; and 2-(meth)acryloyloxyethyl isocyanate.

The (meth)acrylate having two or more (meth)acryloyl groups in a molecule is not particularly limited and includes, for example, compounds shown below.

Di (meth)acrylate having an alicyclic ring, for example, tricyclodecanedimethylol di (meth)acrylate, 1,4-cyclohexanedimethylol di (meth)acrylate, norbornanedimethylol di (meth)acrylate or di (meth)acrylate of hydrogenated bisphenol A; di (meth)acrylate having an aromatic ring, for example, di (meth)acrylate of bisphenol A alkylene oxide adduct including di (meth)acrylate of bisphenol A ethylene oxide adduct and di (meth)acrylate of bisphenol A propylene oxide adduct or di (meth)acrylate of bisphenol A diglycidyl ether; di (meth)acrylate of alkylene glycol, for example, ethylene glycol di (meth)acrylate, propylene glycol di (meth))acrylate, pentanediol di (meth)acrylate or hexanediol di (meth)acrylate; di (meth)acrylates of polyalkylene glycol, for example, diethylene glycol di (meth)acrylate, triethylene glycol di (meth)acrylate, tetraethylene glycol di (meth) acrylate, polyethylene glycol di (meth)acrylate, dipropviene glycol di (meth)acrylate, tripropylene glycol di (meth)acrylate or polypropylene glycol di (meth)acrylate; di- or tri (meth)acrylate of glycerol, for example, di- or tri (meth) acrylate of glycerol or di- or tri (meth)acrylate of diglycerol; di- or tri (meth)acrylate of alkylene oxide adduct of glycerol; di (meth)acrylate bisphenol A alkylene oxide adduct, for example, di (meth)acrylate of bisphenol A alkylene oxide adduct or di (meth)acrylate of bisphenol F alkylene oxide adduct; polyol poly (meth)acrylate, for example, trimethylolpropane tri (meth)acrylate, ditrimethylolpropane tri (meth) acrylate, ditrimethylolpropane tetra (meth)acrylate, pentaerythritol tri (meth)acrylate, pentaerythritol tetra (meth) acrylate, dipentaerythritol penta (meth)acrylate or dipentaerythritol hexa (meth)acrylate; poly (math)acrylate of the alkylene oxide adduct of polyol; di- or tri (meth) acrylate of isocyanuric acid alkylene oxide adduct; and 1,3,5-tri (meth)acryloylhexahydro-s-triazine.

Examples of the (meth)acrylamide include (meth)acrylamide, N,N-dimethyl (meth)acrylamide, N,N-diethyl (meth) acrylamide, N-methylol (meth)acrylamide, N-(3-N,N-dimethylaminopropyl) (meth)acrylamide, methylenebis (meth) acrylamide and ethylenebis (meth)acrylamide.

An oligomer, for example, urethane (meth)acrylate, polyester (meth)acrylate or epoxy (meth)acrylate can also be used as the (meth)acrylic compound.

Moreover, a compound having a (meth)acryloyl group and other ethylenically unsaturated bond can also be used as the (meth)acrylic compound. Specific examples thereof include allyl (meth)acrylate and N,N-diallyl (meth)) acrylamide.

The unsaturated compound (i) is not particularly limited and in addition to the (meth)acrylic compound described above, a vinyl compound, for example, N-vinyl-2-pyrrolidone, divinyl adipate or divinyl sebacate; an allyl compound, for example, triallyl isocyanurate, triallylamine, tetraallyl pyromellitate, N,N,N',N'-tetraallyl-1,4-diaminobutane, tetraallylammonium salt or allylamine; and an unsaturated carboxylic acid, for example, maleic acid or itaconic acid can be used.

Of the unsaturated compounds (i), the (meth)acryloyl compound is preferred. Moreover, the (meth)acryloyl compound having at least one alicyclic or aromatic skeleton in a molecule is more preferred from the standpoint of enhancing the durability, for example, heat resistance, of a polarizing plate produced by adhering a polarizer to the cellulose acylate film, through the adhesive agent containing the (meth)acryloyl compound. Specific preferred examples of the (meth)acrylic compound having at least one alicyclic or aromatic skeleton in a molecule include the alicyclic monofunctional (meth)acrylate, the monofunctional (meth)acrylate having an aromatic ring, the di(meth)acrylate having an alicyclic ring and the di(meth)acrylate having an aromatic ring described above. Among these compounds, a di (meth) acrylate having tricyclodecane skeleton is particularly preferred. Specific examples of the particularly preferred (meth)acrylic compound includes tricyclodecanedimethylol di(meth)acrylate.

The unsaturated compound (i) can be used in order to control the curing rate, the adhesion between the polarizer and the cellulose acylate film, the elastic modulus of the adhesive layer, the durability of adhered product and the like. The unsaturated compound (i) can be used one kind alone or may be used two or more kinds in combination.

In the case of blending the unsaturated compound (i), the blending ratio thereof is preferably 33% by weight or less based on the total composition. The amount attains the excellent adhesion between the polarizer and the cellulose acylate film.

The amount of the unsaturated compound (i) of 35% by weight or less attains the sufficient adhesive strength to the polarizer. The blending ratio of the unsaturated compound (i) is more preferably 30% by weight or less, still more preferably approximately from 5 to 25% by weight, and particularly preferably approximately from 10 to 20% by weight, (Photo-radical Polymerization Initiator (ii))

In the case where the photocurable adhesive agent contains the unsaturated compound (i), it is preferred to blend a photo-radical polymerization initiator (ii) in order to facilitate the radical polymerizability of the unsaturated compound (i) and to attain the sufficient curing rate.

Specific examples of the photo-radical polymerization initiator (ii) are not particularly limited and include an acetophenone photopolymerization initiator, for example, 4'-phenoxy-2,2-dichloroacetophenone, 4'-tert-butyl-2,2-dichloroacetophenone, 2,2-dimethoxy-2-phenylacetophenone, 2-methyl-1-(4-methylthlophenyl)-2-morphplinopropan-1-one, 1-hydroxycyclohexylphenyl ketone, α,α-diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 1-[4-(2-hydroxyethoxy)phenyl]-2-hydroxy-2-methylpropan-1-one or 2-benzyl-2-dimethylamino-1-(4-morpholinophenyl) butan-1-one; a benzoin ether photopolymerization initiator, for example, benzoin, benzoin methyl ether, benzoin ethyl ether, benzoin isopropyl ether or benzoin isobutyl ether; a benzophenone photopolymerization initiator, for example, benzophenone, methyl o-benzoylbenzate, 4-phenylbenzophenone, 4-benzoyl-4'-methyldiphenyl sulfide or 2,4,6-trimethylbenzophenone; a thioxanthone photopolymerization initiator, for example, 2-isopropylthioxanthone, 2,4-diethylthioxanthone, 2,4-dichlorothioxanthone or 1-chloro-4-propoxythioxanthone; an acylphosphine oxide photopolymerization initiator, for example, 2,4,6-trimethylbenzoyldiphenylphosphine oxide, bis (2,6-dimethoxybenzoyl)-2,4,4-trimethylpentylphosphine oxide or bis (2,4,6-trimethylbenzoyl)phenylphosphine oxide; and an oxime-ester photopolymerization initiator, for example, 1,2-octanedione, 1-[4-(phenylthio) phenyl]-, 2-(O-benzoyloxime); and camphorquinone.

The photo-radical polymerization initiator (ii) includes Irgacure 907 produced by BASF and the like.

The photo-radical polymerization initiator (ii) can be used one kind alone or may be used two or more kinds in combination according to the desired performance. In the case of blending the photo-radical polymerization initiator (ii), the blending ratio thereof as preferably 10% by weight or less, more preferably approximately from 0.1 to 3% by weight, based on the total composition.

As to the method for applying the actinic ray curable type adhesive agent in the invention, a conventionally known coating system, for example, reverse gravure coat, direct gravure coat, roll coat, die coat, bar coat or curtain coat can be used. As to the coating system, there are descriptions in Yuji Harasaki, "Coating System", Maki Shoten, 1979.

Examples of the actinic ray curable type adhesive agent which can be used in the invention include adhesive agents having the composition shown in Table 1 below.

TABLE 1

| | Radical Polymerizable Compound | | | | | | Cationic Polymerizable Compound | | Photopolymerization Initiator | | Photo-sensitizer |
|---|---|---|---|---|---|---|---|---|---|---|---|
| Adhesive Agent No. | HEAA | ACMO | 4HBA | HEA | TPGDA | N-Methylolacrylamide | Celloxide 2021P | 1,4-Butanediol Diglycidyl Ether | Irgacure 907 | CPI-100P | 9,10-Dibutoxyanthracene |
| 301 | 50 | — | — | 50 | — | — | — | — | 1.5 | — | — |
| 302 | 30 | 50 | — | — | 20 | — | — | — | 1.5 | — | — |
| 303 | — | 50 | — | — | 20 | 30 | — | — | 1.5 | — | — |
| 304 | 20 | 50 | 10 | 20 | — | — | — | — | 1.5 | — | — |
| 305 | — | — | — | — | — | — | 70 | 30 | — | 2 | 2 |

The abbreviations of the compounds shown in Table 1 above correspond to the compounds shown in Table 2 below, respectively, and the numerals in Table 1 indicate the parts by weight of the respective compounds.

TABLE 2

| Abbreviation | Name/Structural Formula |
| --- | --- |
| HEAA | Hydroxyethylacrylamide |
| ACMO | Acryloylmorpholine |
| 4HBA | 4-Hydroxybutyl Acrylate |
| HEA | Hydroxyethyl Acrylate |
| TPGDA | Tripropylene glycol diacrylate |
| N-Methylolacrylamide | |
| Celloxide 2021P | |
| 1,4-Butanediol Diglycidyl Ether | |

[Stack]

The invention also relates to a stack having the cellulose acylate film of the invention and an actinic ray curable type adhesive agent. In the stack, the actinic ray curable type adhesive agent is preferably provided in the form of a layer (actinic ray curable type adhesive agent layer)

The actinic ray curable type adhesive agent is preferably provided on the side different from the side on which the iodine blocking member has been stacked of the film on which the absorbance $D_Y$ has been measured, and in the case where the cellulose acylate film has a skin layer and a core layer, it is preferably provided on the skin layer. Therefore, the actinic ray curable type adhesive agent is easy to permeate into the cellulose acylate film and the excellent adhesion is attained in the case of sticking to the polarizer.

[Polarizing Plate]

The polarizing plate of the invention can be produced by a production method including a pretreatment step wherein a surface of the cellulose acylate film on which a polarize is adhered is subjected to an easy adhesion treatment, an adhesive agent-coating step wherein the photocurable adhesive agent is coated on the easy adhesion-treated surface of cellulose acylate film, a sticking step wherein a polarizer is stuck on the surface on of cellulose acylate film on which the adhesive agent layer has been coated, and a curing step wherein the adhesive agent layer is cured. In the state where the polarizer and the cellulose acylate film are adhered through the adhesive agent layer.

[Liquid Crystal Display Device]

The liquid crystal display device of the invention includes a liquid crystal cell and the polarizing plate of the invention described above. The liquid crystal display device including a liquid crystal cell and two polarizing plates disposed on both sides of the liquid crystal cell, wherein at least one of the polarizing plates is the polarizing plate of the invention described above, is more preferred.

As to the liquid crystal display device of the invention, the liquid crystal cell is preferably a liquid crystal cell of VA mode or TN mode and particularly preferably a VA mode cell from the standpoint that the film of the invention exhibits the preferred range of Re and Rth described above.

The cellulose acylate film of the invention and the polarizing plate using the film described above can be applied to liquid crystal cells and liquid crystal display devices of various display modes. Various display modes, for example, TN (Twisted Nematic) IPS (In-Plane Switching), FLC (Ferroelectric Liquid Crystal), AFLC (Anti-ferroelectric Liquid Crystal), OCB (Optically Compensatory Bend), STN (Sipper Twisted Nematic), VA (Vertically Aligned) or HAN (Hybrid Aligned Nematic) are proposed.

EXAMPLES

The invention will be described more specifically with reference to the examples below. The materials, amounts of use, proportions, contents of treatments, treating procedures and the like described in the examples can be appropriately altered as long as the gist of the invention is not exceeded. Therefore, the scope of the invention should not be construed as being limited to the specific examples described below.

(Preparation of Cellulose Acylate)

Cellulose acylates were synthesized according to the methods described in JP-A-10-45804 and JP-A-8-231761 and the substitution degrees thereof were measured. Specifically, sulfuric acid (7.8 parts by weight with respect to 100 parts by weight of cellulose) was added as a catalyst and a carboxylic acid which is a raw material of the acyl substituent was added, followed by performing an acylation reaction at 40° C. In this case, the kind and the substitution degree of the acyl group were controlled by adjusting the kind and the amount of the carboxylic acid. After the acylation, ripening was performed at 40° C. The cellulose acylate was washed with acetone to remove the low molecular weight component of the cellulose acylate (cellulose acetate), thereby obtaining cellulose acylates having various average acyl substitution degrees.

<Synthesis of C1>

Into a 500 ml three-necked flask equipped with a mechanical stirrer, a thermometer, a cooling tube and a dropping funnel were weighed 13.8 g of trimethylolpropane, 100 rug of n-dibutyl tin diacetate and 200 ml of tetrahydrofuran (THF) and under cooling with ice, 51.2 ml of phenyl isocyanate was dropwise added to the three-necked flask, followed by allowing to react at 40° C. for 2 hours. After concentration of the reaction mixture, n-hexane was added thereto, and the white solid thus-deposited was collected by filtration. The white solid obtained was recrystallized with methanol/water and dried to obtain the desired compound C1 (white solid, yield: 75%).

<Synthesis of C2>

Into a 1 L three-necked flask equipped with a mechanical stirrer, a thermometer, a cooling tube and a dropping funnel were weighed 25 g of ethylene glycol, 90 mg of n-dibutyl tin diacetate and 500 ml of THF and under cooling with ice, 52.9 g of phenyl isocyanate was dropwise added to the three-necked flask, followed by allowing to react at 40° C. for 2 hours. The reaction mixture was concentrated and purified by silica gel chromatography (solvent: ethyl acetate/n-hexane), and the white solid thus-obtained was dried to obtain the desired compound C2.

The compounds used are shown in Table 3 and Table 4 below.

TABLE 3

| Name of Compound | Structural Formula | Molecular Weight | Number of Group of —C(=O)—NH—Ph | Molecular Weight/(Number of Group of —C(=O)—NH—Ph) |
|---|---|---|---|---|
| C1 | | 491 | 3 | 164 |
| C2 | | 344 | 2 | 172 |
| C3 | | 516 | 2 | 258 |
| C4 | | 611 | 2 | 306 |
| C5 | | 498 | 0 | — |

TABLE 3-continued
| Name of Compound | Structural Formula | Molecular Weight | Number of Group of —C(=O)—NH—Ph | Molecular Weight/ (Number of Group of —C(=O)—NH—Ph) |
|---|---|---|---|---|
| C6 | 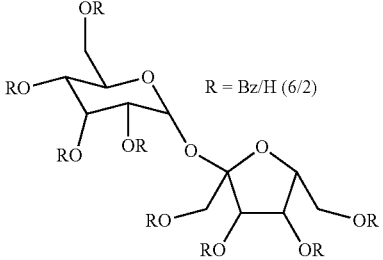 R = Bz/H (6/2) | 1023 | 0 | — |
TABLE 4
| Name of Compound | Structural Formula | Molecular Weight | Number of Group of —C(=O)—NH—Ph | Molecular Weight/ (Number of Group of —C(=O)—NH—Ph) |
|---|---|---|---|---|
| C7 | 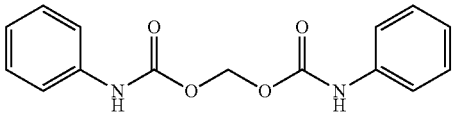 [SMILES: O=C(Nc1ccccc1)OCOC(=O)Nc1ccccc1] | 286.1 | 2 | 143 |
| C8 | 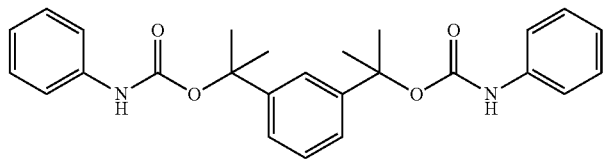 [SMILES: CC(C)(OC(=O)Nc1ccccc1)c1cccc(C(C)(C)OC(=O)Nc2ccccc2)c1] | 432.2 | 2 | 216 |
| C9 | 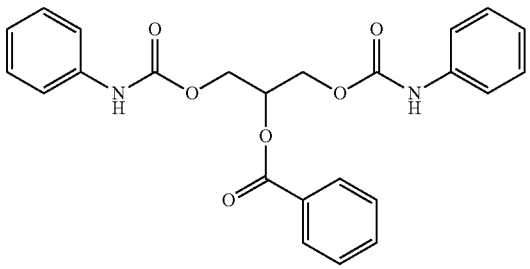 [SMILES: O=C(Nc1ccccc1)OCC(COC(=O)Nc1ccccc1)OC(=O)c1ccccc1] | 434.2 | 2 | 217 |
| C10 | 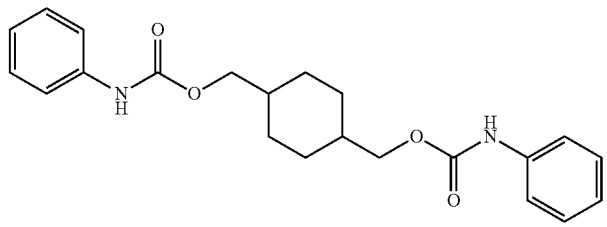 [SMILES: O=C(Nc1ccccc1)OCC1CCC(COC(=O)Nc2ccccc2)CC1] | 382.2 | 2 | 191 |
| C11 |  | 390.4 | 0 | — |

| Name of Compound | Structural Formula | Molecular Weight | Number of Group of —C(=O)—NH—Ph | Molecular Weight/ (Number of Group of —C(=O)—NH—Ph |
|---|---|---|---|---|
| C12 | (structure shown) | 384.5 | 0 | — |

Bz denotes a benzoyl group.

Example 1

<Preparation of Dope for Forming Core Layer>

The composition shown below was charged into a mixing tank and stirred to dissolve the respective components, thereby preparing a dope for forming a core layer.

| | |
|---|---|
| Cellulose acetate (substitution degree: 2.6) | 100 parts by weight |
| C1 | 20 parts by weight |
| Methylene chloride | 384 parts by weight |
| Methanol | 96 parts by weight |

<Preparation of Dope for Forming Skin Layer>

The composition shown below was charged into a mixing tank and stirred to dissolve the respective components, thereby preparing a dope for forming a skin layer.

| | |
|---|---|
| Cellulose acetate (substitution degree: 2.5) | 100 parts by weight |
| C1 | 20 parts by weight |
| Methylene chloride | 519 parts by weight |
| Methanol | 27 parts by weight |

<Production of Cellulose Acylate Film>

Using a band casting apparatus, the dope for forming a core layer and the dope for forming a skin layer prepared as described above were co-casted so as to form a core layer of 39 µm and a skin layer of 1 µm. The coating was peeled off in the state where the residual solvent amount in the dope was 25% by weight and dried in the state where the residual solvent amount was from 3 to 5% by weight Then, the film was further dried by transporting it between rolls of a heat treatment apparatus, thereby obtaining a cellulose acylate film for Example 1. The thickness of the cellulose acylate film thus-produced was 40 µm.

Examples 2 to 14 and Comparative Examples 1 to 8

Cellulose acylate films for Examples 2 to 14 and Comparative Examples 1 to 8 were produced in the same manner as in Example 1 except for changing the substitution degree of cellulose acetate, the kind of additive, the content of each component and the ratio of methylene chloride in the solvent to those shown in Table 5 below.

As to each of the films obtained, the iodine diffusion indexes X and Y were calculated. The values obtained are also shown in Table 5 below.

The iodine diffusion index X is a value determined in the following manner:

The cellulose acylate film is immersed in an aqueous solution (a) containing 5.4 mg/h of potassium iodide and 0.36 mg/L of iodine at 60° C. for 30 minutes, absorbance $D_0$ of the cellulose acylate film at a wavelength of 360 nm before the immersion in the aqueous solution (a) and absorbance $D_X$ of the cellulose acylate film at a wavelength of 360 cm after the immersion in the aqueous solution (a) are measured, and from the absorbance $D_0$ and the absorbance $D_X$, the iodine diffusion. index X is calculated according to formula (1) shown below. As an ultraviolet visible spectrophotometer, UV-3150 produced by Shimadzu Corp. was used.

$$\text{Iodine diffusion index } X = (\text{absorbance } D_X - \text{absorbance } D_0)/\text{thickness (µm) of cellulose acylate film} \quad \text{Formula (1)}$$

The iodine diffusion index Y is a value determined in the following manner:

A sample in which an adhesive tape (an adhesive tape, for example, a heat resistance masking tape produced by 3M Co.) is stacked on one side of the cellulose acylate film and a sample in which the adhesive tape is stacked on the other side of the cellulose acylate film are prepared, these samples are immersed in the aqueous solution (a) at 60° C. for 1 minute, the adhesive tape is peeled off from the cellulose acylate film, and absorbances of the respective cellulose acylate films at a wavelength of 360 nm are measured. Of the absorbances, the larger value is taken as absorbance $D_Y$ and the iodine diffusion index is calculated according to formula (2) shown below.

$$\text{Iodine diffusion index } Y = \text{absorbance } D_Y - \text{absorbance } D_0 \quad \text{Formula (2)}$$

<Production of Polarizing plate>

Each of the cellulose acylate films for the examples and comparative examples Bras prepared, and the surface of the film was subjected to a corona discharge treatment. The conditions of the corona discharge treatment were corona output intensity of 2.0 kW and line speed of 18 m/min. The surface of the skin layer side of the cellulose acylate film to which the corona discharge treatment had been subjected and a polarizer having a cellulose triacetate film (Fujitac TD80UF, produced by Fujifilm Corp.) stuck on one surface thereof were stuck through the actinic ray curable type adhesive agent prepared to obtain a stack of cellulose acylate film/polarizer/Fulitac TD80UF. Thus, a polarizing plate for each of the examples and comparative examples was obtained.

The each of the polarizing plates obtained was evaluated for the evaluation items shown below. The evaluation results are also shown in Table 5 below. As to the evaluation results of color loss of polarizer, adhesion and haze, the excellent result is ranked as A, the good results is ranked as B, and the results having real harm are ranked as C and D in stages.

<<Color Loss of Polarizer>>

With respect to the polarizing plate for each of the examples and comparative examples produced above, orthogonal transmittance of the polarizer at a wavelength of 410 nm was measured according to the method shown below. The orthogonal transmittance CT of the polarizing plate was measured using automatic polarizing film measuring device VAP-7070 produced by JASCO Corp. at a wavelength of 410 nm according to the method shown below. Two samples (5 cm×5 cm) in which the polarizing plate was stuck on a glass through a cohesive agent were prepared. In this case, the cellulose acylate film produced above was stuck so that it faced on the side of the glass. The orthogonal transmittance measurement was carried out by setting the glass side of the sample so as to face a light source. The two samples were measured, respectively, and the average value thereof was taken as the orthogonal transmittance. Further, after preservation in an environment of 85° C. and 85% relative humidity for 250 hours, the orthogonal transmittance of the polarizing plate was measured in the same mariner as described above. The variation amount of orthogonal transmittance before and after the preservation was determined to evaluate according to the criteria shown below and the results obtained are shown in Table 5 below as the color loss of polarizer.

A: Variation amount of orthogonal transmittance at a wavelength of 410 nm is less than 1%
B: Variation amount of orthogonal transmittance at a wavelength of 410 nm is 1% or more and less than 2%.
C: Variation amount of orthogonal transmittance at a wavelength of 410 nm is 2% or more and less than 5%.
D: Variation amount of orthogonal transmittance at a wavelength of 410 nm. is 5% or more.

<<Adhesion>>

The adhesion between the polarizer and each of the cellulose acylate films for the examples and the comparative examples in the polarizing plate produced was evaluated according to the method shown below.

An acrylic cohesive agent sheet was stuck on a surface of each of the films for the examples and the comparative examples. The polarizing plate with the cohesive agent thus-obtained was cut into a test piece having a width of 25 mm and length of 80 mm, the cohesive agent surface thereof was stuck to a soda glass, and the test piece was subjected to pressure treatment at a pressure of 5 kgf/cm$^2$ and a temperature of 50° C. for 20 minutes in an autoclave and then allowed to stand in an atmosphere of temperature of 23° C. and relative humidity of 60% for one day. In this state, a cut was formed at 45° degree between the film for each of the examples and the comparative examples and the polarizer by a cutter blade, one end of the film for each of the examples and the comparative examples in the length direction (one side having a width of 25 mm) was raised 10 mm, and the side raised was fixed to a polyethylene terephthalate (PET) film having a width of 25 mm and length of 80 mm with an adhesive agent or an adhesive tape so that the sides having a width of 25mm are overlapped. 10 mm. Using a tensile testing machine (RTF-1210, produced by A&D Co., Ltd.), the PET film added to the end of the sample in the length direction (one side having a width of 25 mm) was griped, a 90° peel test was performed at a cross-head speed (grip movement speed) of 200 mm/mm n in an atmosphere of temperature of 23° C. and relative humidity of 60%, thereby evaluating the adhesion of the film for each of the examples and the comparative examples. The above-described manner of this evaluation test of the adhesion is illustrated in FIG. 2.

The adhesion forth of the polarizing plate was evaluated according to the criteria shown below because it is preferably 1.5 N or more, more preferably 2.0 N or more, in view of maintaining the sufficient reworkability.

A: Adhesion forth is 2.0 N or more
B: Adhesion forth is 1.5 N or more and less than 2.0 N
C: Adhesion forth is 1.0 N or more and less than 1.5 N
D: Adhesion forth is less than 1.0 N <<Haze>>

The haze in each of the cellulose acylate films for examples and the comparative examples was measured. The measurement of haze was performed for each film of 50 mm×50 mm in an environment of 25° C. and 55% relative humidity using a haze meter NDH2000 (produced by Nippon Denshoku Industries Co., Ltd.) in accordance with JIS K 7136 (2000). As to the cellulose acylate film, the haze measured by the method described above is preferably less than 1%, more preferably less than 0.7%, and particularly preferably less than 0.5%. The haze was evaluated according to the criteria shown below.

A: Haze value is less than 0.5%
B: Haze value is 0.5% or more and less than 0.7%
C: Haze value is 0.7% or more and less than 1%
D: Haze value is 1% or more

TABLE 5

| | Core Layer | | | | Skin Layer | | | | |
|---|---|---|---|---|---|---|---|---|---|
| | Kind of Additive | Amount of Additive (to cellulose acylate, wt %) | Ratio of Methylene Chloride (to total solvent, wt %) | Substitution Degree of Cellulose Acylate [—] | Kind of Additive | Amount of Additive (to cellulose acylate, wt %) | Ratio of Methylene Chloride (to total solvent, wt %) | Substitution Degree of Cellulose Acylate [—] | Molecular Weight of Additive/(Number of Group of —C(=O)—NH—Ph) |
| Example 1 | C1 | 20 | 80 | 2.6 | C1 | 20 | 95 | 2.5 | 164 |
| Example 2 | C2 | 20 | 80 | 2.6 | C2 | 20 | 95 | 2.5 | 172 |
| Comparative Example 1 | C3 | 20 | 80 | 2.6 | C3 | 20 | 95 | 2.5 | 258 |
| Comparative Example 2 | C4 | 20 | 80 | 2.6 | C4 | 20 | 95 | 2.5 | 306 |
| Comparative Example 3 | C5 | 20 | 80 | 2.6 | C5 | 20 | 95 | 2.5 | — |
| Comparative Example 4 | C6 | 20 | 80 | 2.6 | C6 | 20 | 95 | 2.5 | — |
| Example 3 | C7 | 20 | 80 | 2.6 | C7 | 20 | 95 | 2.5 | 143 |
| Comparative Example 5 | C8 | 20 | 80 | 2.6 | C8 | 20 | 95 | 2.5 | 216 |
| Comparative Example 6 | C9 | 20 | 80 | 2.6 | C9 | 20 | 95 | 2.5 | 217 |

TABLE 5-continued

| | | | | | | | | | |
|---|---|---|---|---|---|---|---|---|---|
| Example 4 | C10 | 20 | 80 | 2.6 | C10 | 20 | 95 | 2.5 | 191 |
| Comparative Example 7 | C11 | 20 | 80 | 2.6 | C11 | 20 | 95 | 2.5 | — |
| Comparative Example 8 | C12 | 20 | 80 | 2.6 | C12 | 20 | 95 | 2.5 | — |
| Example 5 | C1 | 15 | 80 | 2.6 | C1 | 20 | 95 | 2.5 | 164 |
| Comparative Example 9 | C1 | 10 | 80 | 2.6 | C1 | 20 | 95 | 2.5 | 164 |
| Comparative Example 10 | C1 | 5 | 80 | 2.6 | C1 | 20 | 95 | 2.5 | 164 |
| Example 6 | C1 | 20 | 80 | 2.6 | C1 | 20 | 90 | 2.5 | 164 |
| Comparative Example 11 | C1 | 20 | 80 | 2.6 | C1 | 20 | 87 | 2.5 | 164 |
| Comparative Example 12 | C1 | 20 | 80 | 2.6 | C1 | 20 | 80 | 2.5 | 164 |
| Example 7 | C1 | 20 | 70 | 2.6 | C1 | 20 | 95 | 2.5 | 164 |
| Example 8 | C1 | 20 | 87 | 2.6 | C1 | 20 | 95 | 2.5 | 164 |
| Example 9 | C1 | 20 | 90 | 2.6 | C1 | 20 | 95 | 2.5 | 164 |
| Example 10 | C1 | 20 | 92 | 2.6 | C1 | 20 | 95 | 2.5 | 164 |
| Example 11 | C1 | 20 | 80 | 2.3 | C1 | 20 | 95 | 2.5 | 164 |
| Example 12 | C1 | 20 | 80 | 2.9 | C1 | 20 | 95 | 2.5 | 164 |
| Example 13 | C1 | 20 | 80 | 3.0 | C1 | 20 | 95 | 2.5 | 164 |
| Example 14 | C1 | 20 | 80 | 2.6 | C1 | 20 | 95 | 1.9 | 164 |
| Example 15 | C1 | 20 | 80 | 2.6 | C1 | 20 | 95 | 2.1 | 164 |
| Example 16 | C1 | 20 | 80 | 2.6 | C1 | 20 | 95 | 3.0 | 164 |
| Example 17 | C1 | 20 | 80 | 2.6 | C1 | 20 | 95 | 2.5 | 164 |

| | | | Evaluation Result | | | | |
|---|---|---|---|---|---|---|---|
| | Layer Thickness [μm] | Adhesive Agent No. | Iodine Diffusion Index X [1/μm] | Iodine Diffusion Index Y [—] | Color Loss of Polarizer | Adhesion (actinic ray curable type adhesive agent) | Haze (transparency) |
| Example 1 | 40 | 301 | 0.0030 | 0.020 | A | A | A |
| Example 2 | 40 | 301 | 0.0035 | 0.020 | B | A | A |
| Comparative Example 1 | 40 | 301 | 0.0050 | 0.020 | C | A | A |
| Comparative Example 2 | 40 | 301 | 0.0060 | 0.020 | D | A | A |
| Comparative Example 3 | 40 | 301 | 0.0065 | 0.020 | D | A | A |
| Comparative Example 4 | 40 | 301 | 0.0062 | 0.020 | D | A | A |
| Example 3 | 40 | 301 | 0.0030 | 0.020 | A | A | A |
| Comparative Example 5 | 40 | 301 | 0.0050 | 0.020 | C | A | A |
| Comparative Example 6 | 40 | 301 | 0.0050 | 0.020 | C | A | A |
| Example 4 | 40 | 301 | 0.0042 | 0.020 | B | A | A |
| Comparative Example 7 | 40 | 301 | 0.0055 | 0.020 | D | A | A |
| Comparative Example 8 | 40 | 301 | 0.0052 | 0.020 | D | A | A |
| Example 5 | 40 | 301 | 0.0040 | 0.030 | B | A | A |
| Comparative Example 9 | 40 | 301 | 0.0050 | 0.050 | C | A | A |
| Comparative Example 10 | 40 | 301 | 0.0100 | 0.050 | D | A | A |
| Example 6 | 40 | 301 | 0.0030 | 0.015 | A | B | A |
| Comparative Example 11 | 40 | 301 | 0.0030 | 0.012 | A | C | A |
| Comparative Example 12 | 40 | 301 | 0.0030 | 0.011 | A | D | A |
| Example 7 | 40 | 301 | 0.0029 | 0.018 | A | A | B |
| Example 8 | 40 | 301 | 0.0045 | 0.022 | B | A | A |
| Example 9 | 40 | 301 | 0.0045 | 0.020 | B | A | B |
| Example 10 | 40 | 301 | 0.0046 | 0.020 | B | A | D |
| Example 11 | 40 | 305 | 0.0045 | 0.020 | B | A | A |
| Example 12 | 40 | 305 | 0.0025 | 0.020 | A | A | B |
| Example 13 | 40 | 305 | 0.0020 | 0.020 | A | A | C |
| Example 14 | 40 | 305 | 0.0035 | 0.020 | B | A | B |
| Example 15 | 40 | 305 | 0.0033 | 0.023 | A | A | B |
| Example 16 | 40 | 305 | 0.0030 | 0.015 | A | B | B |
| Example 17 | 40 | 305 | 0.0030 | 0.020 | A | A | A |

From Table 5 shown above, it is understood that the evaluation results of the color loss of polarizer and the adhesion are good as to the polarizing plates produced by using the cellulose acylate films obtained in the examples.

Moreover, in order to investigate a relationship between the ratio of good solvent with respect to the total solvent in the dope for forming a skin layer and the adhesion, films were prepared by changing only the good solvent, ratio in the dope for forming a skin layer used in Example 1 and the adhesion to the polarizer was measured.

FIG. 1 is a graph in which the adhesion between the cellulose acylate film and the polarizer is plotted on the vertical axis and the content ratio of methylene chloride with respect to the total solvent in the dope for forming a skin layer is plotted on the horizontal axis.

As shown in FIG. 1, it can be seen that when the content ratio of methylene chloride with respect to the total solvent in the dope for forming a skin layer is 90% by weight or more, the adhesion between the cellulose acylate film and the polarizer is remarkably excellent.

What is claimed is:

1. A cellulose acylate film comprising cellulose acylate and a compound A which is represented by the following formula (J) which has a group represented by the following formula (G) and in which a value obtained by dividing a molecular weight of the compound by a number of the groups represented by formula (G) contained in the compound is 200 or less, wherein a content of the compound A is 15% by weight or more based on a content of the cellulose acylate, an iodine diffusion index X is less than 0.005 and an iodine diffusion index Y is 0.015 or more:

Formula (J)

wherein $L^{11}$ represents an alkylene group, $L^{12}$ represents a single bond, any of —O—, —NR$^1$—, —S— and —C(=O)— or a group formed by a combination of these groups, R$^1$ represents a hydrogen atom or a substituent, Z represents an n1-valent group, n1 represents an integer of 2 to 6 and when plural $L^{11}$ and $L^{12}$ are present, plural $L^{11}$ and $L^{12}$ may be the same or different from each other, and G represents the group represented by formula (G):

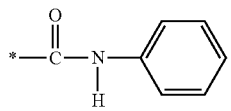

Formula (G)

where in formula (G), * represents a connecting site;

the iodine diffusion index X is a value determined in the following manner:

the cellulose acylate film is immersed in an aqueous solution (a) containing 5.4 mg/L of potassium iodide and 0.36 mg/L of iodine at 60° C. for 30 minutes, absorbance $D_0$ of the cellulose acylate film at a wavelength of 360 nm before the immersion in the aqueous solution (a) and absorbance $D_X$ of the cellulose acylate film at a wavelength of 360 nm after the immersion in the aqueous solution (a) are measured, and from the absorbance $D_0$ and the absorbance $D_X$, the iodine diffusion index X is calculated according to the following formula (1):

Iodine diffusion index X=(absorbance $D_X$−absorbance $D_0$)/ thickness (μm) of cellulose acylate film;   Formula (1)

the iodine diffusion index Y is a value determined in the following manner:

a sample in which an iodine blocking member is stacked on one side of the cellulose acylate film and a sample in which an iodine blocking member is stacked on an other side of the cellulose acylate film are prepared, each of the samples is immersed in the aqueous solution (a) at 60° C. for 1 minute, the iodine blocking member is peeled off from the cellulose acylate film, absorbance of each of the cellulose acylate films at a wavelength of 360 nm is measured, and of the absorbances, the larger value is taken as absorbance $D_Y$ and the iodine diffusion index Y is calculated according to the following formula (2):

Iodine diffusion index Y=absorbance $D_Y$−absorbance $D_0$   Formula (2).

2. The cellulose acylate film as claimed in claim 1, wherein the cellulose acylate film has a skin layer and a core layer.

3. The cellulose acylate film as claimed in claim 2, wherein an average acyl substitution degree DS1 of cellulose acylate contained in the skin layer is from 2.1 to 2.8 and an average acyl substitution degree DS2 of the cellulose acylate contained in the core layer is from 2.4 to 2.95.

4. A production method of the cellulose acylate film as claimed in claim 2, wherein a dope for forming a skin layer containing from 90 to 98% by weight of a good solvent for the cellulose acylate based on a total amount of all solvents contained in the dope and a dope for forming a core layer are co-casted, thereby forming the cellulose acylate film.

5. The production method of the cellulose acylate film as claimed in claim 4, wherein the dope for forming a core layer is a dope for forming a core layer containing from 70 to 87% by weight of a good solvent for the cellulose acylate based on a total amount of all solvents contained in the dope for forming a core layer.

6. A stack comprising the cellulose acylate film as claimed in claim 1 and an actinic ray curable type adhesive agent.

7. A polarizing plate comprising the cellulose acylate film as claimed in claim 1 and a polarizer which are stuck through an actinic ray curable type adhesive agent.

8. A liquid crystal display device comprising a liquid crystal cell and the polarizing plate as claimed in claim 7.

* * * * *